(12) United States Patent
Hurwitz

(10) Patent No.: US 7,220,011 B2
(45) Date of Patent: May 22, 2007

(54) MARINE CRAFT AND APPARATUS INCLUDING ELECTROLUMINESCENT AUXILIARY ILLUMINATION

(76) Inventor: Marni M. Hurwitz, P.O. Box 502, 226 Mountain Side Rd., Mendham, NJ (US) 07945

( * ) Notice: Subject to any disclaimer, the term of this patent is extended or adjusted under 35 U.S.C. 154(b) by 0 days.

(21) Appl. No.: 10/649,604

(22) Filed: Aug. 28, 2003

(65) Prior Publication Data

US 2004/0042200 A1    Mar. 4, 2004

Related U.S. Application Data

(60) Continuation of application No. 09/769,272, filed on Jan. 26, 2001, now abandoned, which is a division of application No. 09/728,083, filed on Dec. 4, 2000, now abandoned, which is a division of application No. 09/447,823, filed on Nov. 23, 1999, now abandoned.

(60) Provisional application No. 60/109,517, filed on Nov. 23, 1998.

(51) Int. Cl.
*F21V 9/16* (2006.01)
(52) U.S. Cl. .......................................... 362/84; 2/2.15
(58) Field of Classification Search ................ 362/84, 362/477, 255, 103, 189, 540, 368; 114/343, 114/364; 43/17.5
See application file for complete search history.

(56) References Cited

U.S. PATENT DOCUMENTS

| | | | | |
|---|---|---|---|---|
| 4,055,174 A | * | 10/1977 | LeVasseur | ............. 128/201.11 |
| 4,622,623 A | * | 11/1986 | Zei | ............................... 362/84 |
| 4,740,870 A | * | 4/1988 | Moore et al. | ................ 362/477 |
| 4,752,263 A | | 6/1988 | Pritchard et al. | |
| 4,864,473 A | | 9/1989 | Tokarz et al. | |
| 4,947,293 A | * | 8/1990 | Johnson et al. | ............. 362/485 |
| 4,954,931 A | * | 9/1990 | Hassler, Jr. | .................. 362/555 |
| 5,034,847 A | * | 7/1991 | Brain | ......................... 362/205 |
| 5,162,828 A | * | 11/1992 | Furness et al. | .............. 353/122 |
| 5,224,772 A | * | 7/1993 | Fustos | ......................... 362/105 |
| 5,495,401 A | * | 2/1996 | Evans | ......................... 362/477 |
| 5,570,945 A | | 11/1996 | Chien et al. | |
| 5,676,451 A | | 10/1997 | Tabanera | |
| 5,730,079 A | * | 3/1998 | Totty et al. | .................. 114/343 |
| 5,779,511 A | * | 7/1998 | Davidson, Jr. | ............... 441/80 |
| 5,886,822 A | * | 3/1999 | Spitzer | ....................... 359/630 |
| 5,929,571 A | | 7/1999 | Pauly | |
| 6,082,282 A | * | 7/2000 | Kickert | ....................... 114/106 |
| 6,176,601 B1 | | 1/2001 | Nester | |
| 6,190,027 B1 | * | 2/2001 | Lekson | ....................... 362/495 |
| 6,464,381 B2 | | 10/2002 | Anderson, Jr. et al. | |

* cited by examiner

*Primary Examiner*—Ali Alavi
*Assistant Examiner*—Hargobind S. Sawhney
(74) *Attorney, Agent, or Firm*—Ernest D. Buff & Associates, LLC; Ernest D. Buff

(57) ABSTRACT

Safety and sports equipment, as well as apparel and accessories, including one or more wire-like or flat electroluminescent lamps for illumination. The lamps may be powered by battery, solar energy, or any other suitable means of energy. The lamps may further be secured to an object, embedded within a rigid surface, or recessed within a material. The lamps may be either permanently, temporarily, or removably secured to the 6 object that is being illuminated.

1 Claim, 45 Drawing Sheets

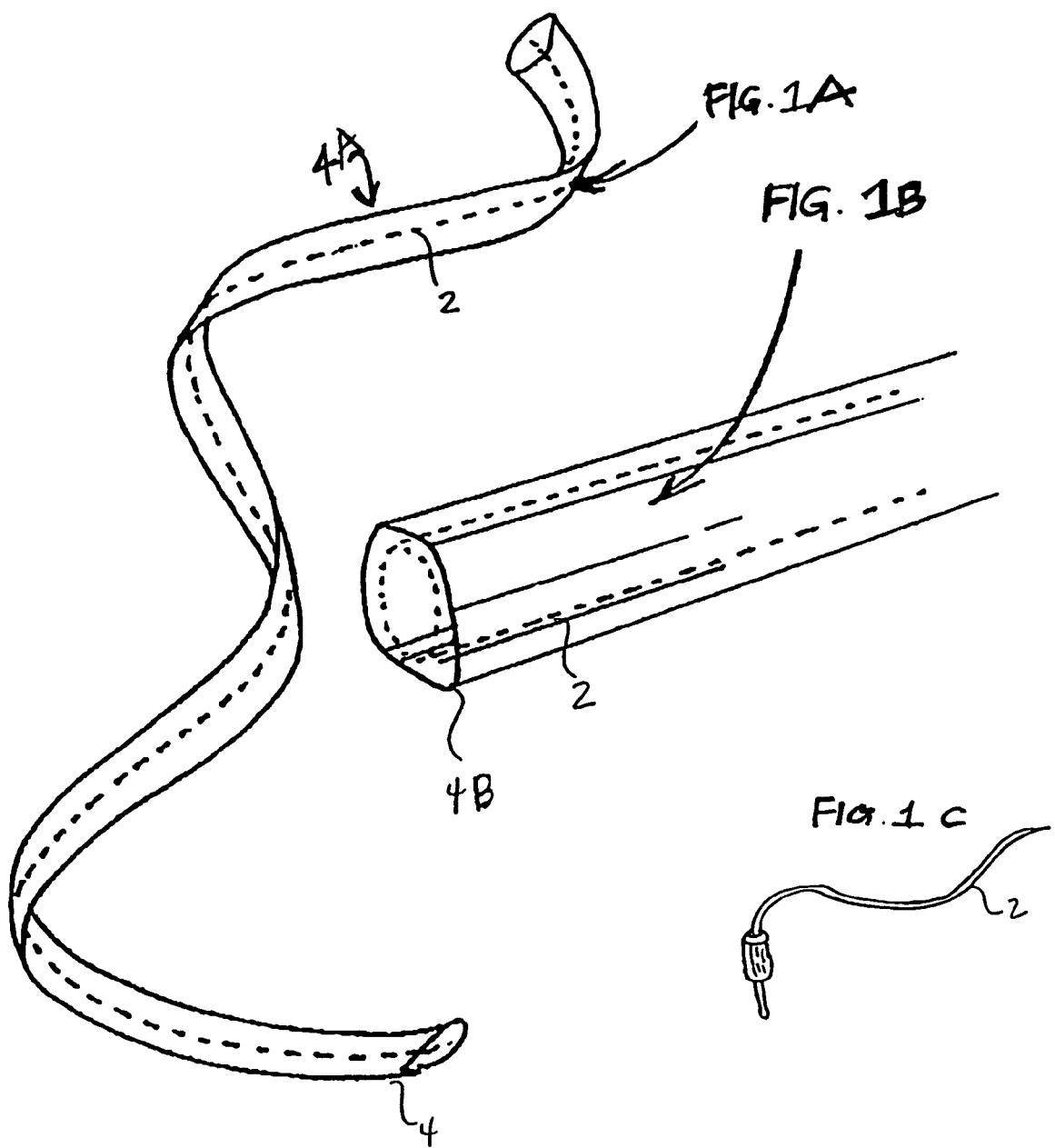

FIGURE 2A
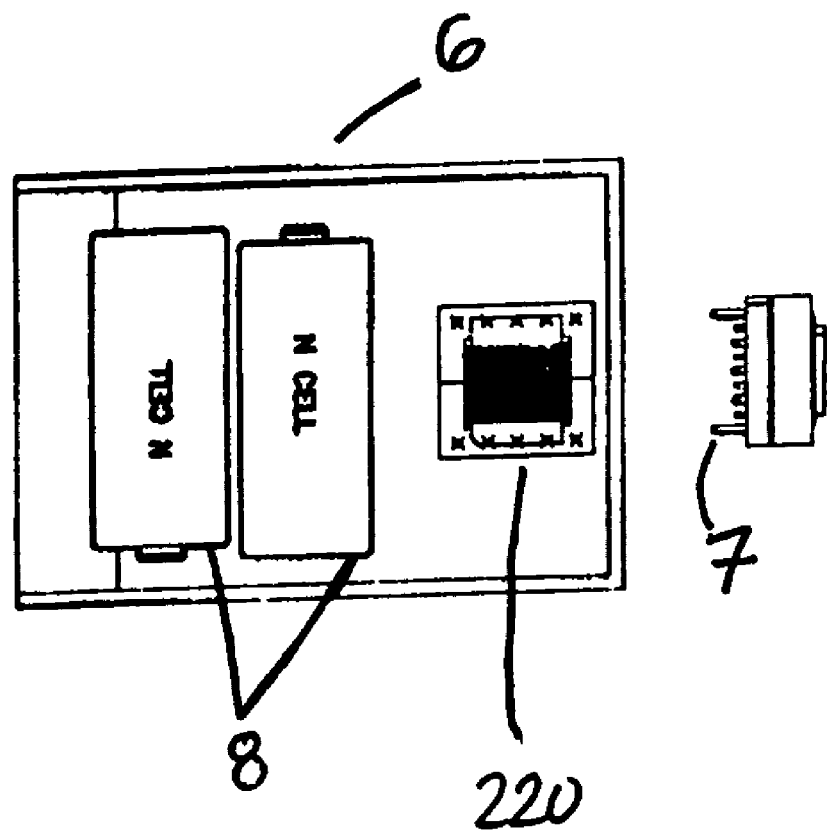
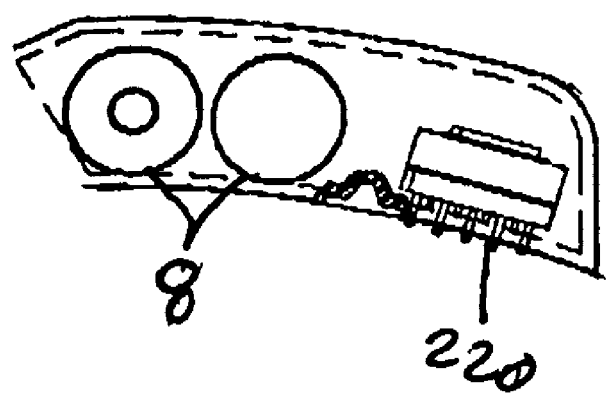

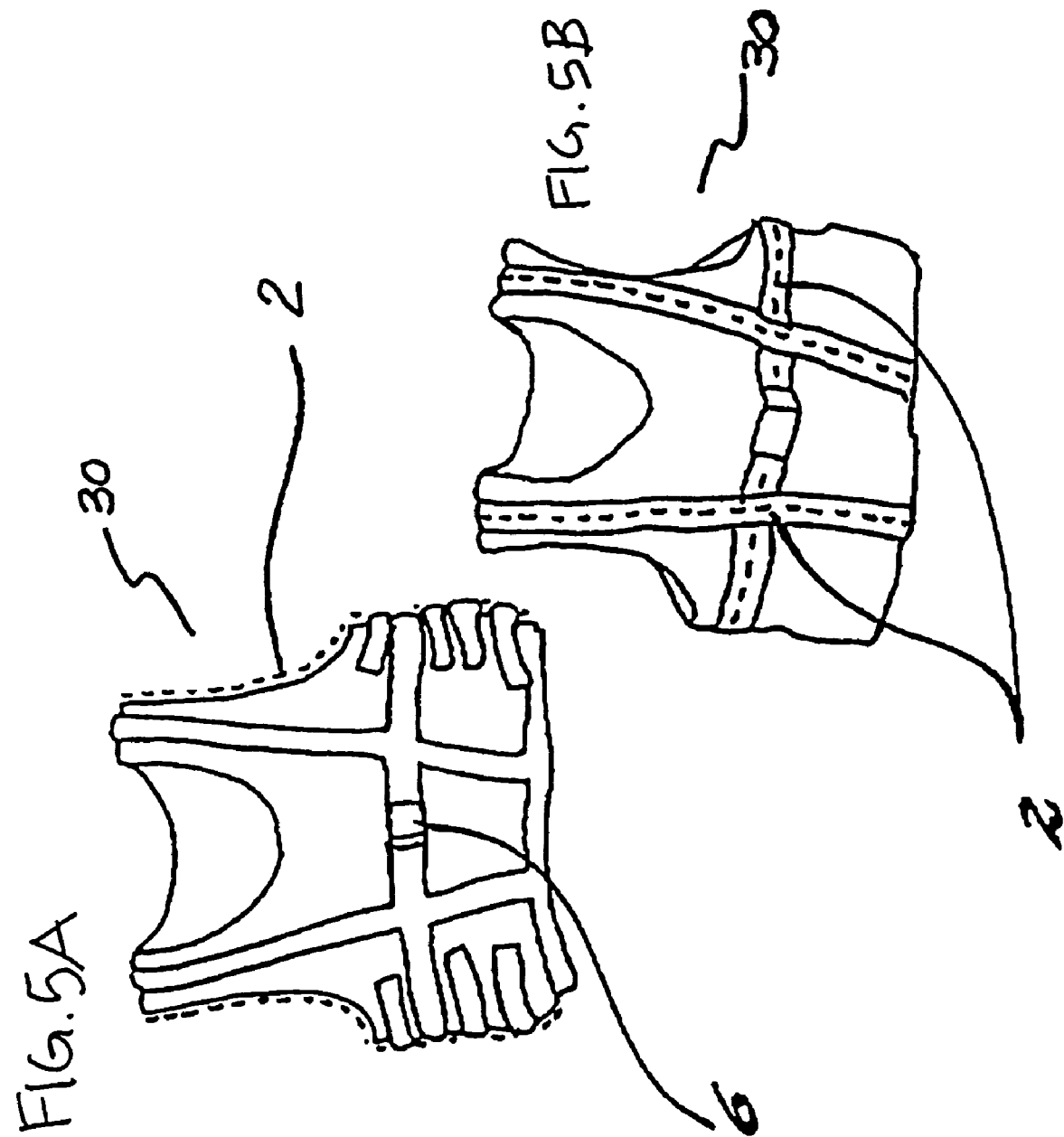

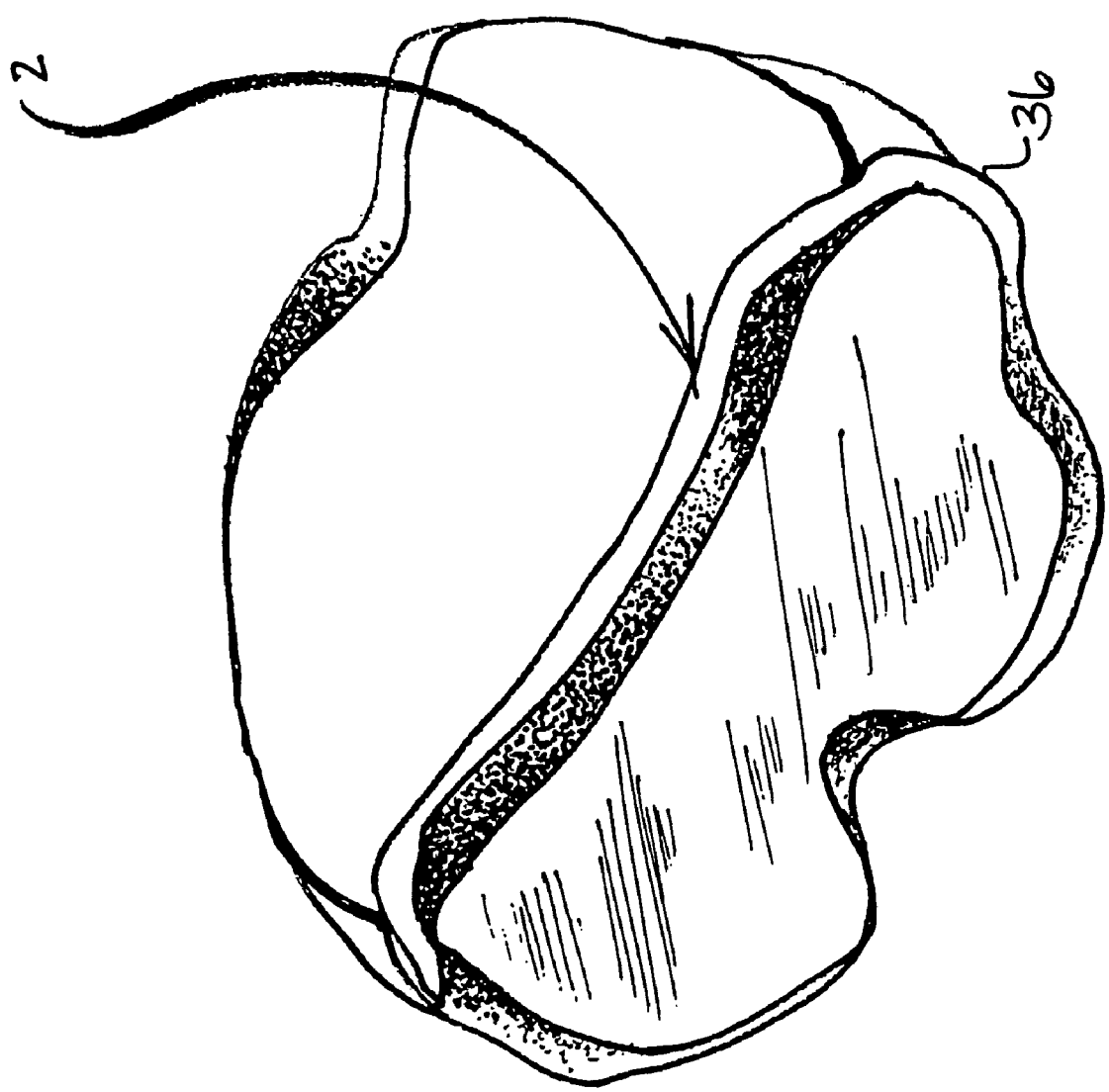

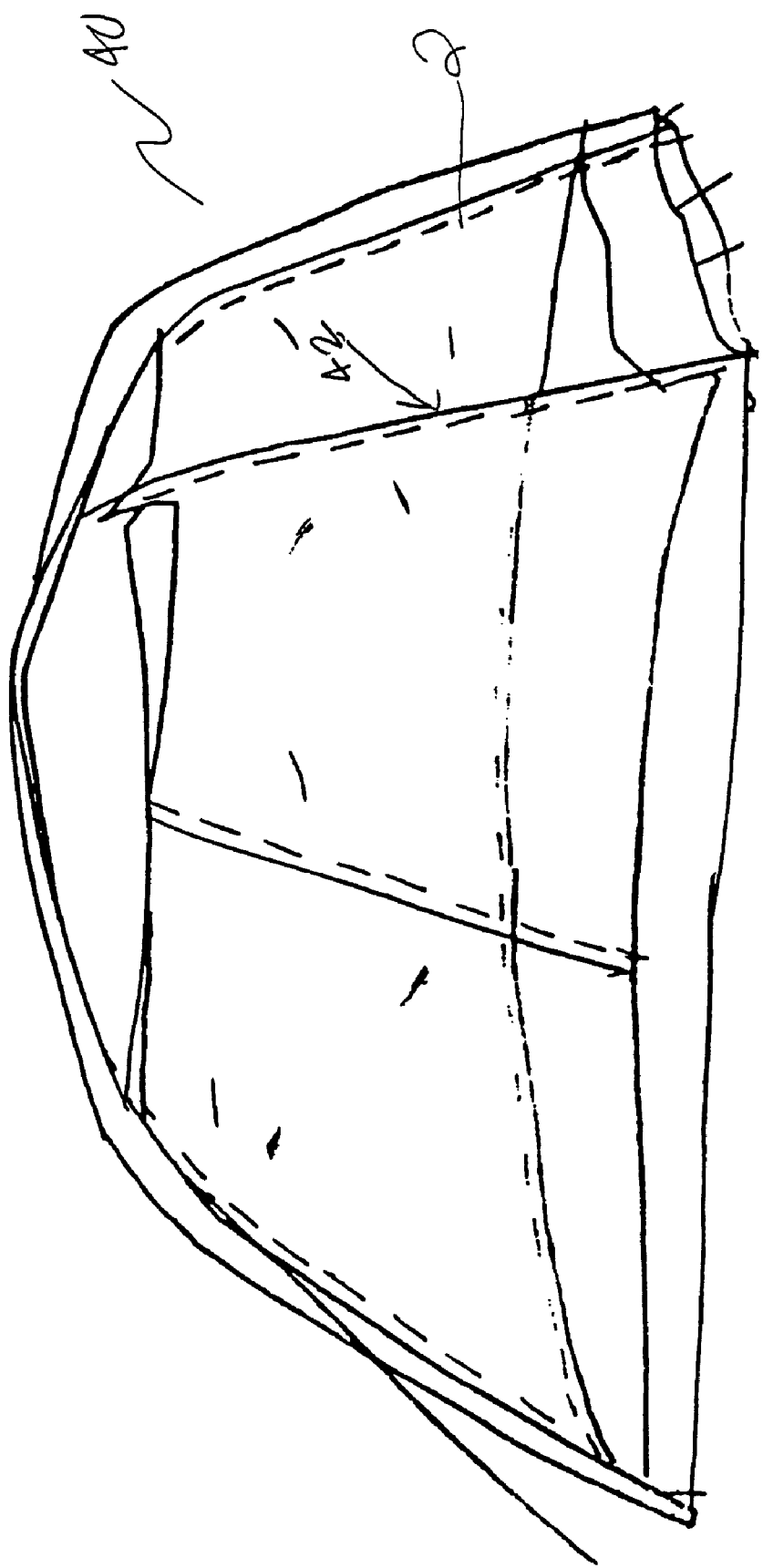

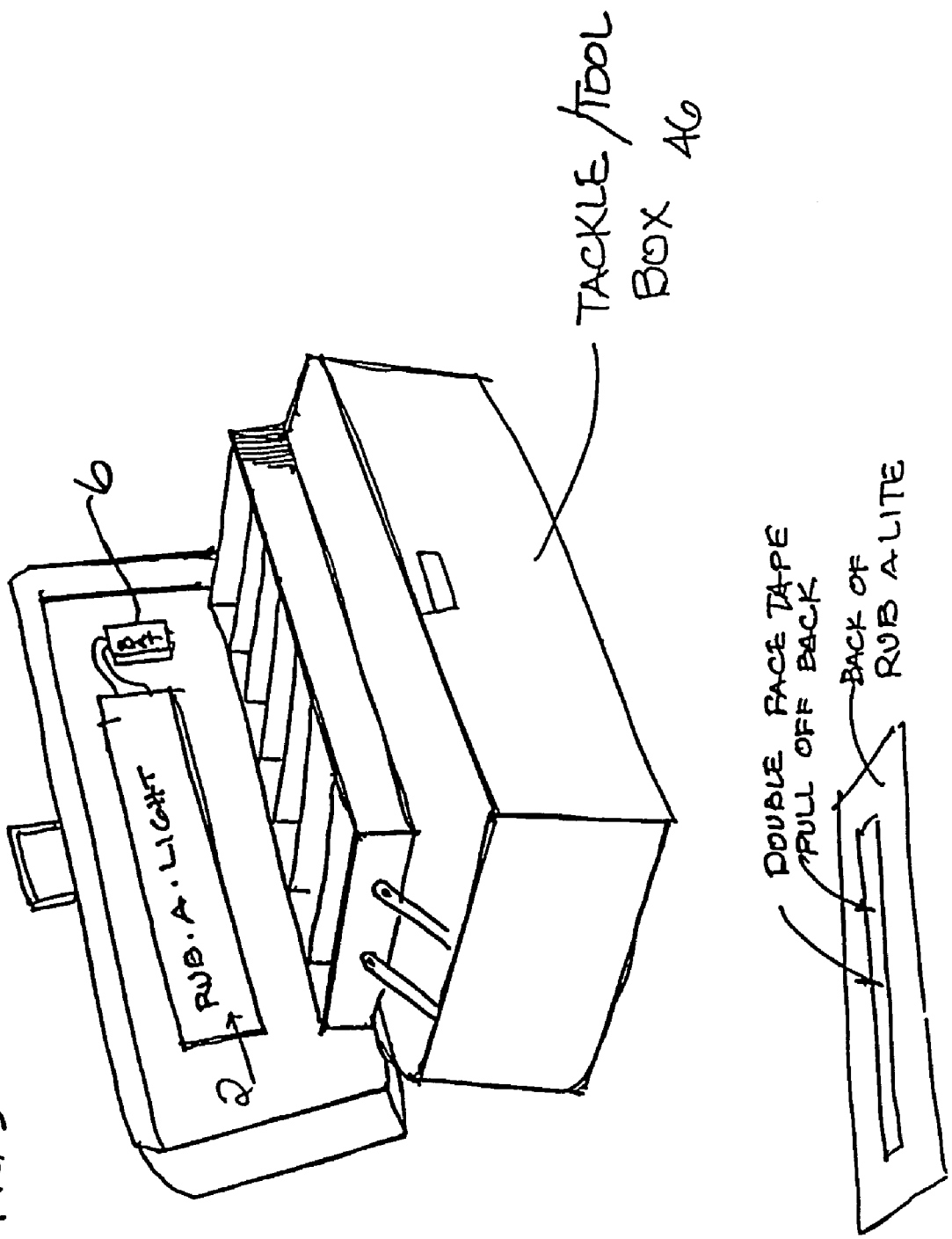

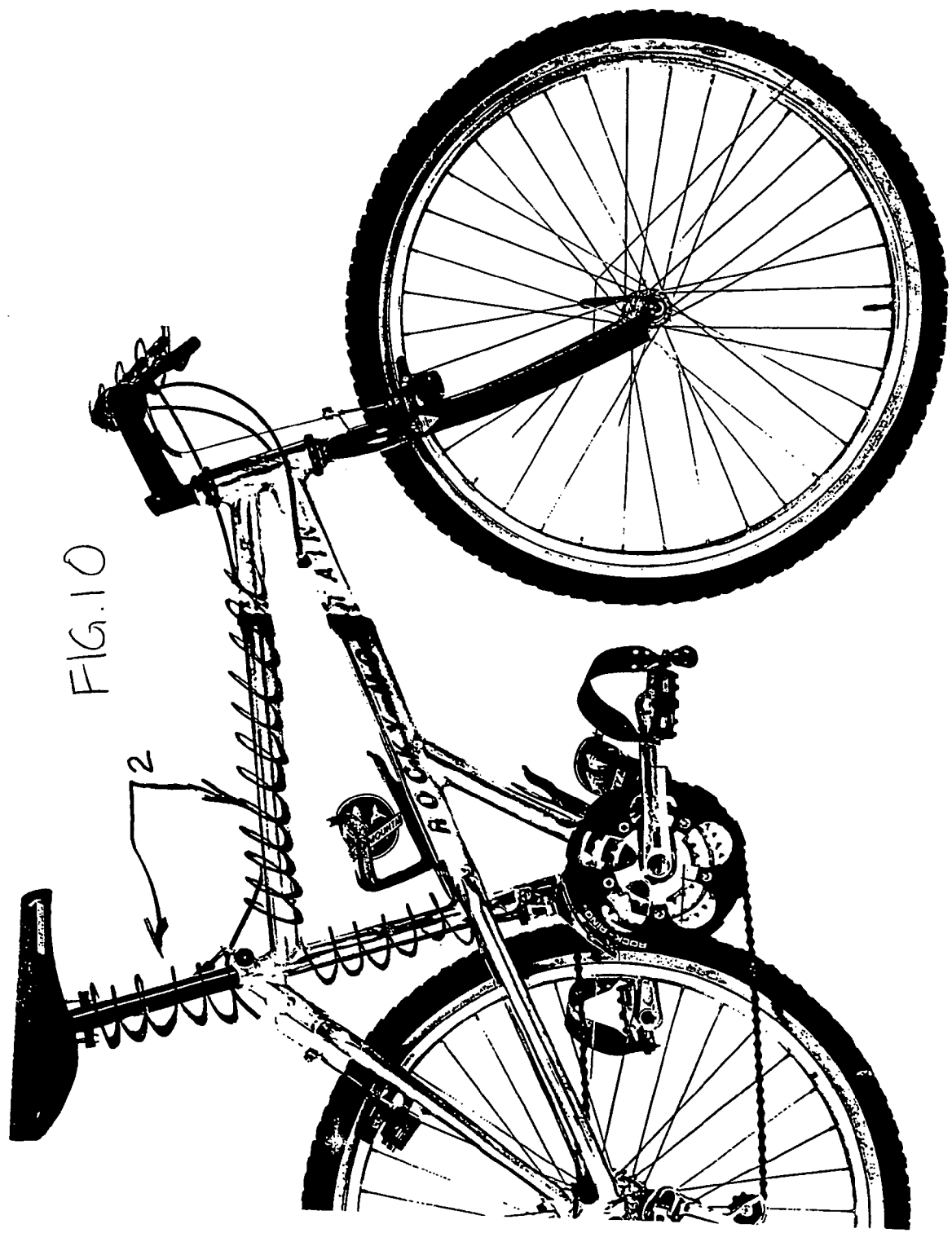

neckspiral armspiral

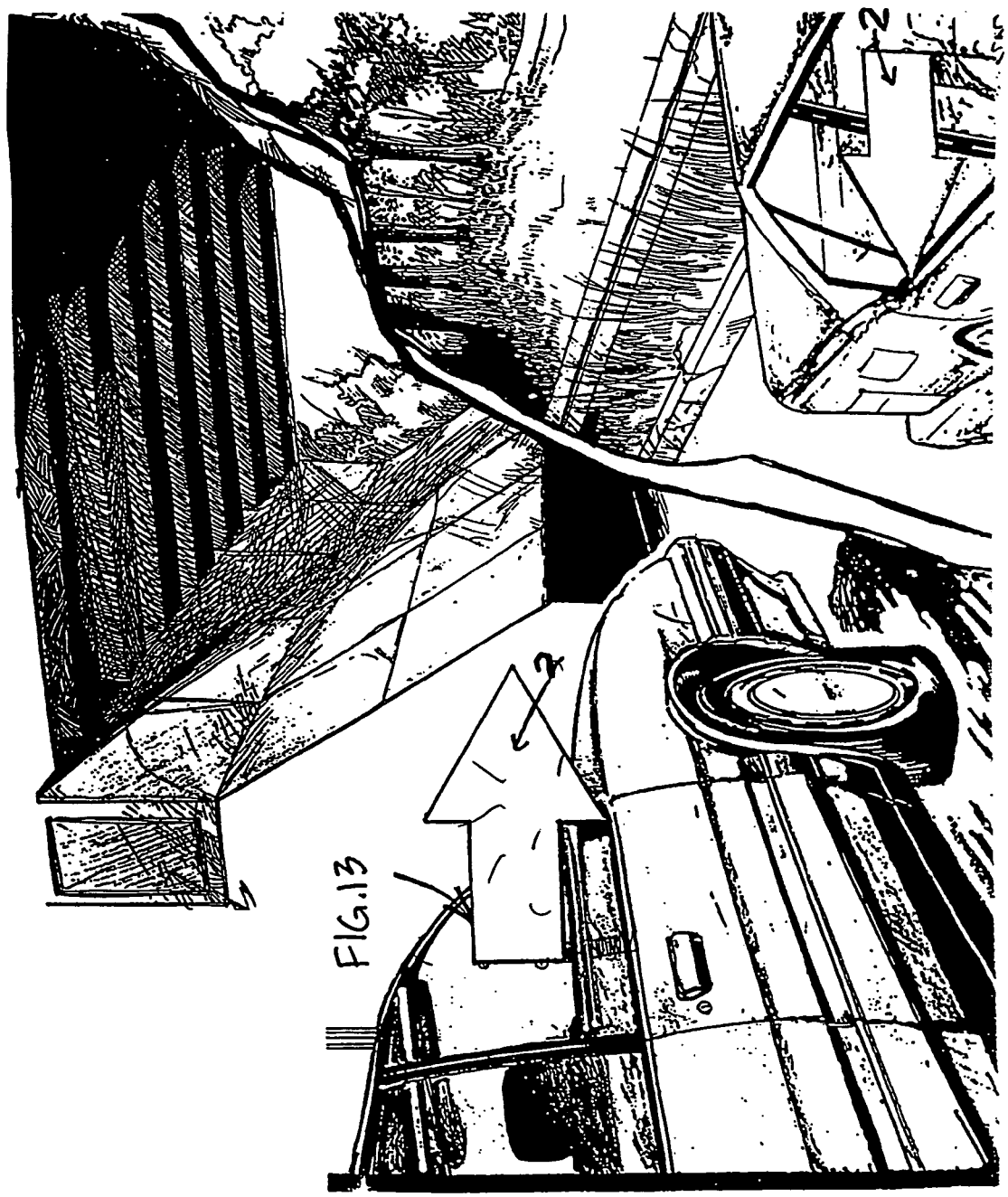

FIG. 15A headband
FIG. 15B
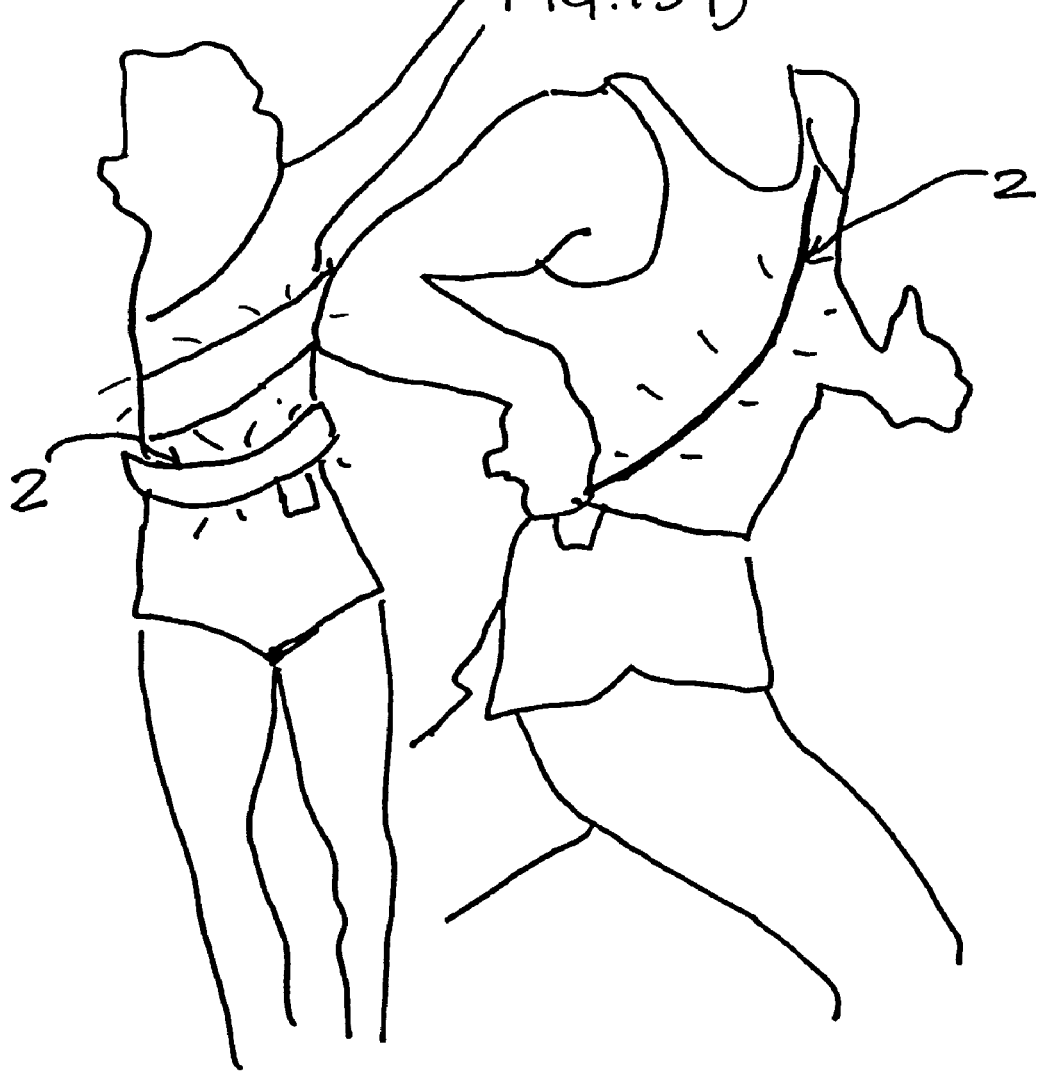

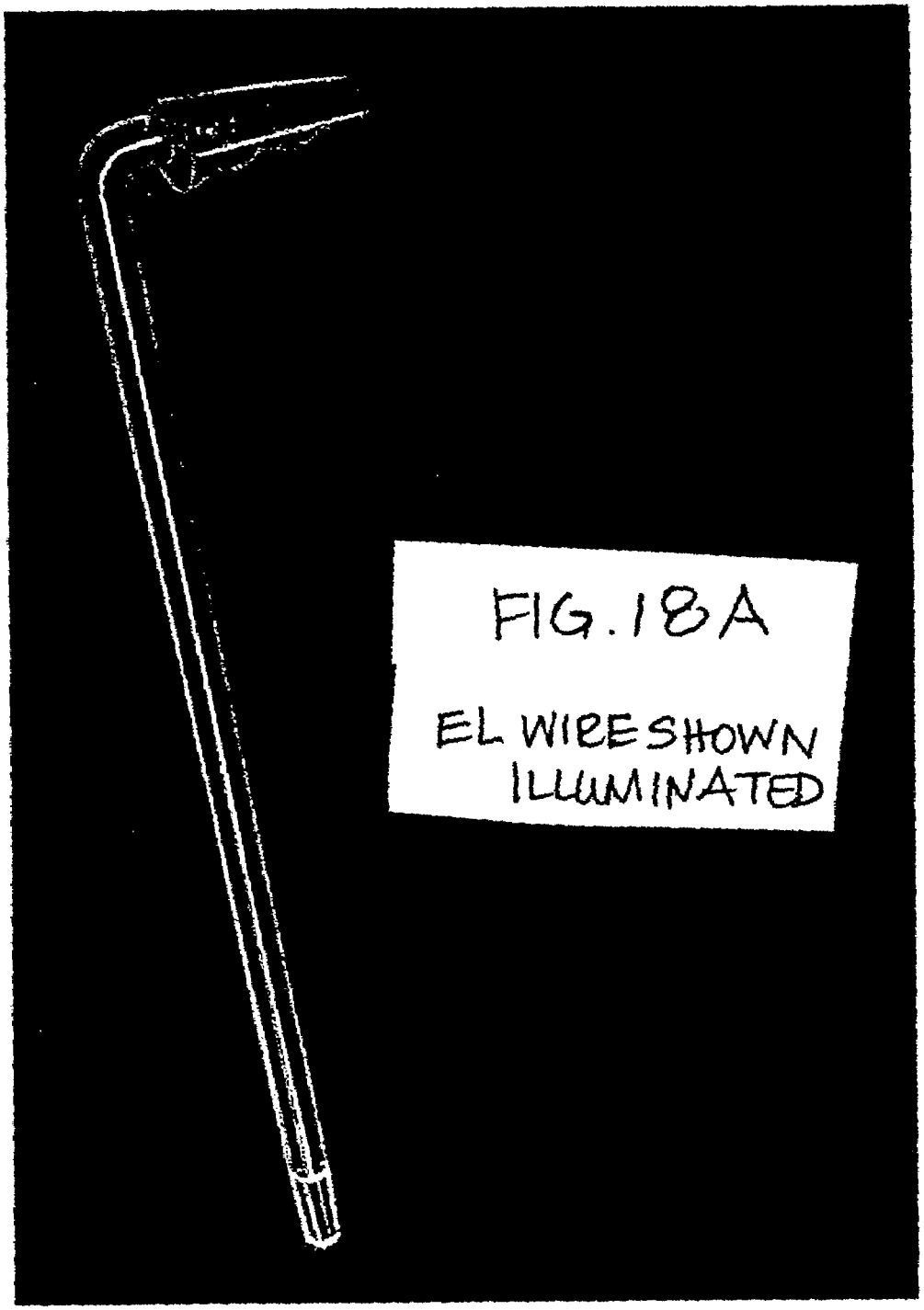

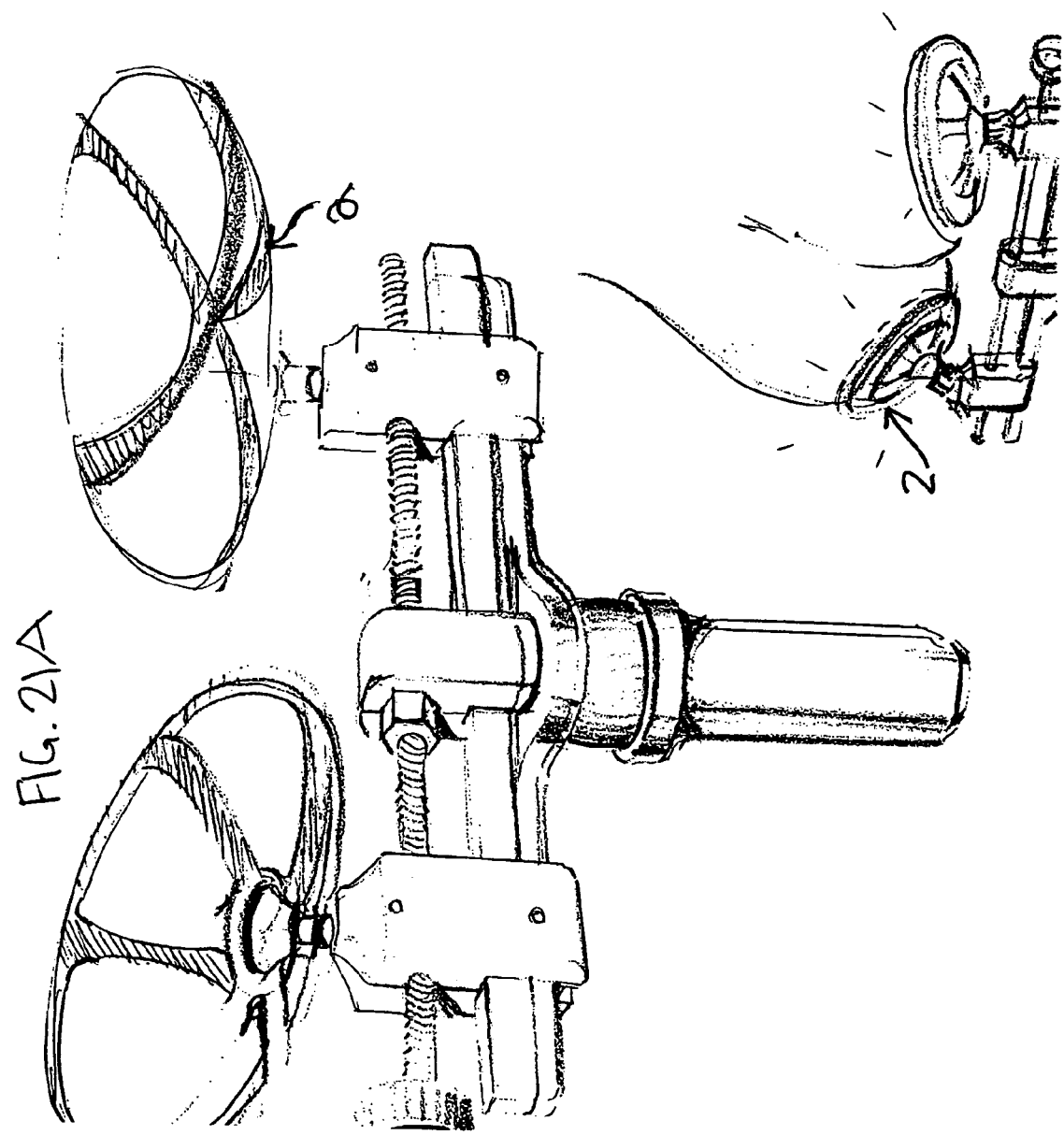

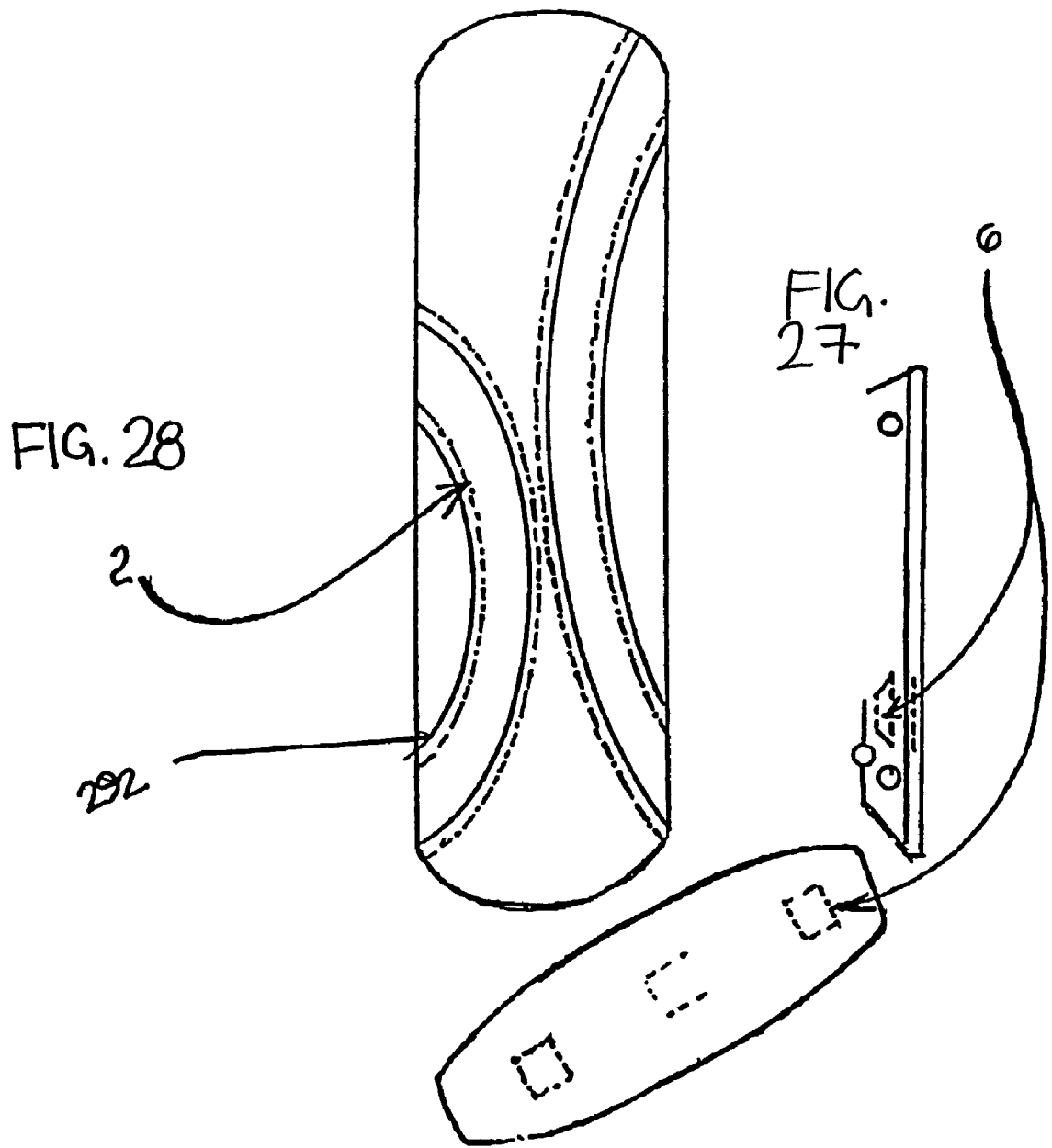

FIG. 32A
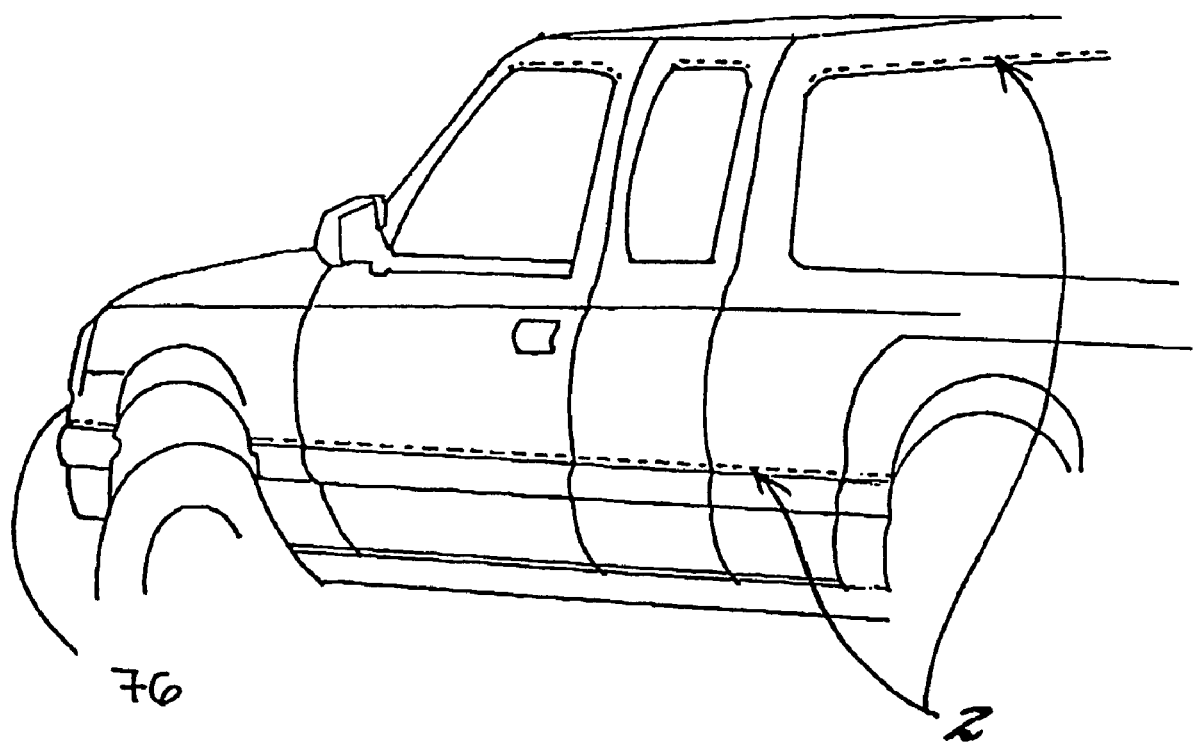
76
2
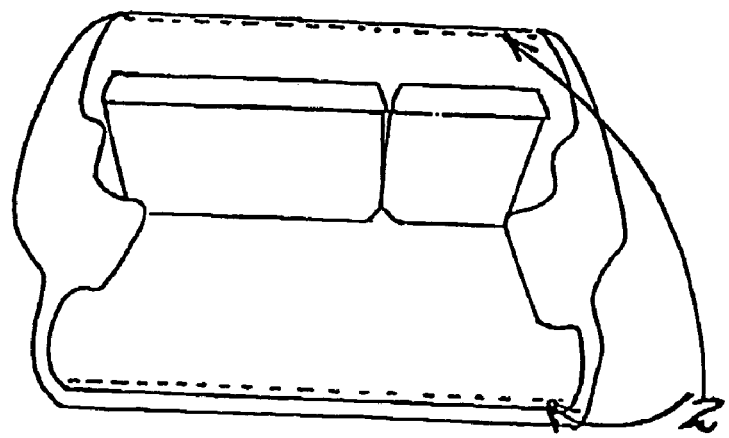
FIG. 32B

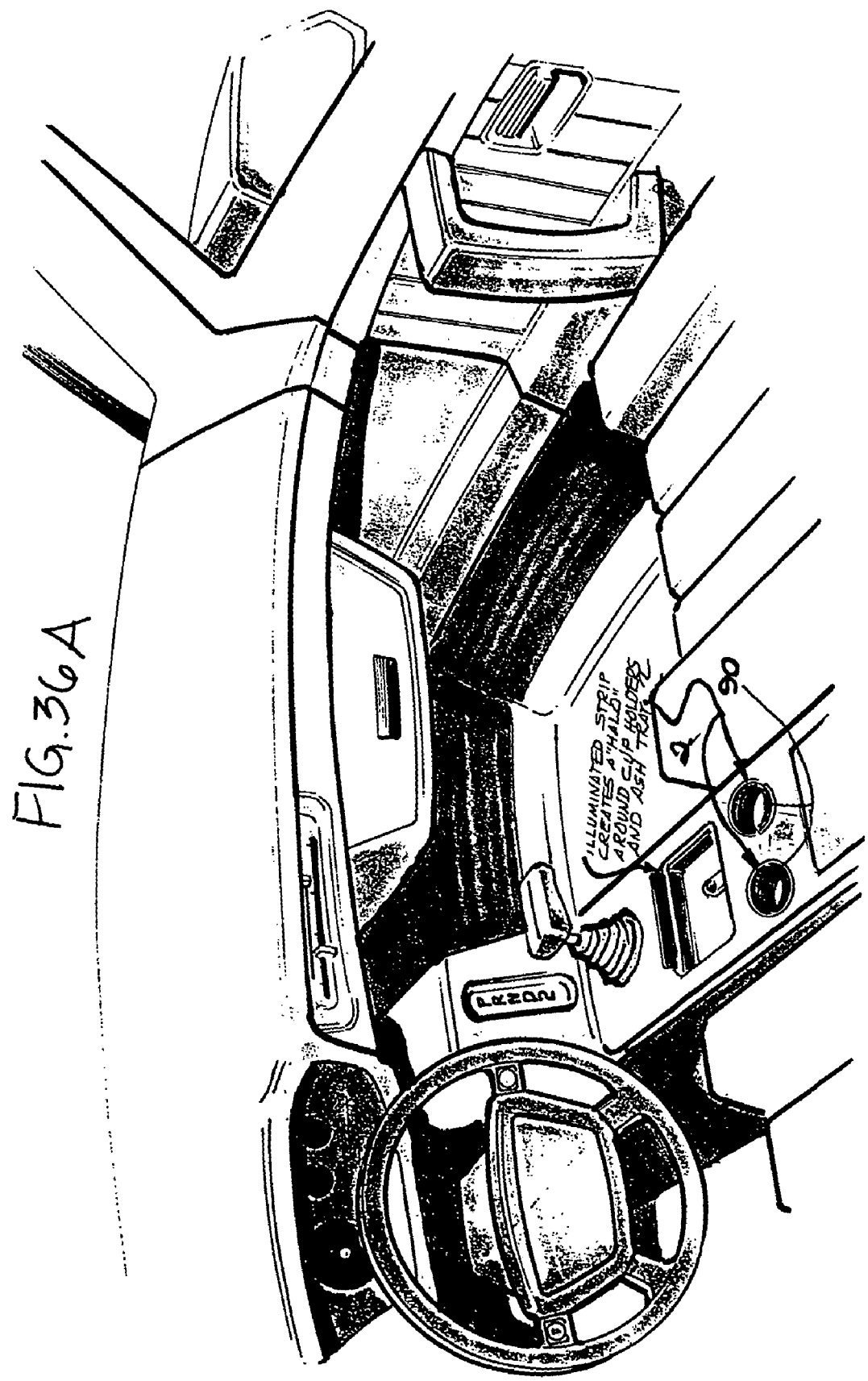

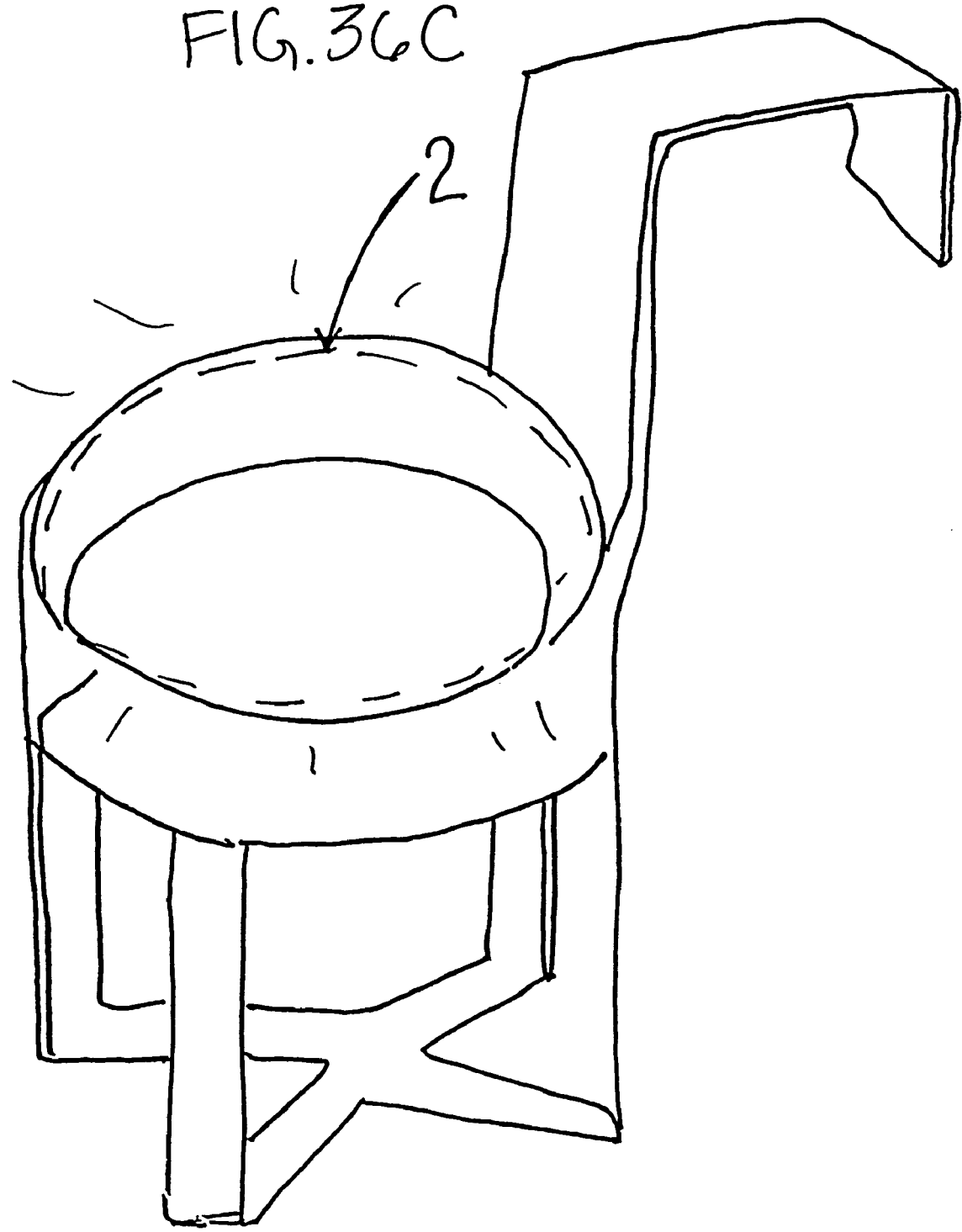

MARINE CRAFT AND APPARATUS INCLUDING ELECTROLUMINESCENT AUXILIARY ILLUMINATION

This is a Continuation of application Ser. No. 09/769,272, filed Jan. 26, 2001 now abandoned, which is a Divisional of application Ser. No. 09/728,083 filed Dec. 4, 2000 now abandoned, which is a Divisional of application Ser. No. 09/447,823 filed Nov. 23, 1999; the disclosures of which are incorporated herein by reference.

BACKGROUND OF THE INVENTION

This application claims the benefit of U.S. Provisional Application No. 60/109,517 filed on Nov. 23, 1998, which is incorporated by reference. The present invention generally relates to safety and sports equipment and accessories which are illuminated by electroluminescent phosphors arranged in an electroluminescent light source, particularly, a cable or wire-like light source, to enhance the appearance of the product and to improve visibility of the user. As increasingly more people are becoming health conscious, exercise and recreational activities are no longer just carried out during the daylight hours. Many sports activities are being conducted in low light, dusk, or dark surroundings. The present invention is intended to make sports enthusiasts more visible during these low light conditions.

In addition, rescue personnel and construction workers are required to perform duties during low light or no light conditions. Over the years, there have been efforts to render rescue personnel and construction workers visible during reduced visibility conditions. However, until now, an adequate solution has not been achieved.

Finally, efforts have been made to alert individuals of particular conditions using barriers, signs, wall barriers, cones, and barrels, for example. However, until now, there has not been an adequate solution for rendering these alerting devices visible during low light or no light conditions.

Previous methods for illuminating safety and sports equipment, as well as clothing and accessories, have included incorporating incandescent lamps, LEDs, and reflective materials into the various articles. However, these methods suffer from the following disadvantages.

Products and devices incorporating incandescent light bulbs and LEDs are typically bulky and relatively heavy as compared to their light emitting power. These conventional light sources are prone to fail because they are not shock proof or water proof. Incandescent lights and LEDs, to a lesser extent, produce heat that may become uncomfortable to wear when incorporated into a garment or used in a product proximate to a flammable solution, vapor or material. Similarly, incandescent lamps and LEDs have to be used with caution because they are large and tend to protrude from the surface of the product and may be easily damaged. In addition, LEDs illuminate a very small area that can only be viewed at a limited angle. Therefore, a large quantity of LEDs are required to achieve a large field of view.

Typically, because reflective material is not self-illuminating, it can only be seen when light impinges upon it. Reflective material is only as good as the light that it reflects, therefore, visibility resulting from reflective material is limited to a short distance.

Thus, there is a need for improved means for providing illumination to sports and safety equipment, as well as apparel and accessories.

Electroluminescent phosphors arranged in electroluminescent light sources or lamps have been developed in which the electroluminescent phosphor fibers emit light upon application of an alternating current to the fibers. Electroluminescent lamps have typically been arranged as a flat strip. However, a wire-like electroluminescent lamp has recently been developed, as described in U.S. Pat. No. 5,485,355, which is herein expressly incorporated by reference.

The wire-like electroluminescent light source includes at least two electrodes arranged to create an electric field between them upon application of a voltage, and at least one type of pulverulent electroluminophor dispersed in a dielectric binder and disposed proximate to the electrodes to emit light of a specific color(s) upon application of the voltage to the electrodes. A transparent sheath encases the electrodes and the electroluminophor.

The wire-like electroluminescent light source is flexible, shapeable and radiates light uniformly in all directions. The light source may be monochrome or polychrome, depending upon the type of electroluminophor powder(s) used.

The wire-like electroluminescent light source is completely UV resistant and waterproof. The phosphor fibers are durable, flexible, elastic, demand little power and are not harmful to the environment. The light sources do not generate heat, or harmful emissions. The wire-like electroluminescent light source is round and provides 360° of visibility without glare. The wire-like electroluminescent light source is capable of withstanding extreme weather conditions.

SUMMARY OF THE INVENTION

Accordingly, it is an object of the present invention to provide illumination for safety and sports equipment, clothing, and accessories that overcomes the problems of the aforementioned prior art. This illumination is provided using at least one electroluminescent light source, preferably a wire-like electroluminescent light source, to secure the safety of individuals during reduced visibility conditions.

Yet another object of the present invention is to provide safety and sports equipment, apparel, and accessories with at least one wire-like electroluminescent lamp, which is either permanently or temporarily secured to the product and which includes a power unit, which may also be permanently or temporarily secured to the product, either separately from the lamp or as one unit.

Another object of the present invention is to provide safety and sports equipment, apparel, and accessories with at least one wire-like electroluminescent lamp, which is encapsulated in an extrusion. The encapsulated lamp may be either permanently or temporarily secured to the product and includes a power unit, which may also be permanently or temporarily secured to the product, either separately from the lamp or as one unit.

It is a further object of the present invention to provide safety and sports equipment, as well as apparel and accessories, with at least one wire-like electroluminescent lamp, which may be accommodated in a sleeve, which is secured, either permanently or temporarily, to a product to provide illumination of the product, and thereby improve safety during low light and no light conditions.

It is a further object of the present invention to provide safety and sports equipment, as well as apparel and accessories, with at least one wire-like electroluminescent lamp, which may be embedded into a surface of the product to provide illumination to the product, as well as the user to improve safety during low light and no light conditions.

It is still a further object of the invention to provide safety and sports equipment, as well as apparel and accessories, with at least one replaceable wire-like electroluminescent lamp.

Another object of the present invention is to provide safety and sports equipment, as well as apparel and accessories, with at least one wire-like electroluminescent lamp which provides 360° of illumination to the product.

It is another object of the present invention to provide safety and sports equipment, as well as apparel and accessories, with at least one wire-like electroluminescent lamp, which may be easily manipulated into various shapes in accordance with a design, logo, symbol, letter(s) or word(s).

Finally, the objects of the present invention are achieved by providing at least one wire-like electroluminescent lamp to sports equipment, apparel and accessories including, but not limited to, diving suits, life preservers, shirts, shorts, wrist bands, arm bands, head bands, gloves, jackets, pants, hats, and backpacks, athletic shoes, skis, ski poles, snowboards, skateboards, in-line skates, bicycles, surf boards, water skis, jet skis, diving equipment, ropes, chains, and goggles, for example, and by providing a power unit to activate light from the wire-like electroluminescent fibers of the wire-like electroluminescent lamp. According to the present invention, the wire-like electroluminescent lamp and/or the power unit may be either temporarily or permanently secured to the sports equipment, apparel or accessories, or made an inherent part of the equipment by naturally integrating the lamp and/or power unit into the construction. Further according to the present invention, the wire-like electroluminescent lamp itself may be secured to the product, or encapsulated in an extrusion and secured to the produce, or accommodated in a sleeve which is secured to the product. In addition, the lamp encapsulated in an extrusion may be accommodated in a sleeve which is secured to the product.

The above-mentioned objects of the invention are further achieved by securing at least one wire-like electroluminescent lamp to safety equipment, apparel, and accessories such as flags, poles, signs, rescue vehicles and boats, and road barriers, for example, and by providing a power unit to activate the electroluminescent fibers. Once again, both the wire-like electroluminescent lamp and the power unit may either be temporarily or permanently secured to the safety equipment by various means, or incorporated into the product by way of construction. In addition, the wire-like electroluminescent lamp itself may be secured to the product, or encapsulated in an extrusion or accommodated in a sleeve which may be secured to the product. In addition, the lamp encapsulated in an extrusion may be accommodated in a sleeve which is secured to the product.

BRIEF DESCRIPTION OF THE DRAWINGS

Other features and advantages of the present invention will become apparent from the following description given by way of non-limiting examples with reference to the accompanying drawings, in which:

FIG. 1A illustrates a wire-like electroluminescent lamp accommodated in a sleeve according to the present invention;

FIG. 1B illustrates a wire-like electroluminescent lamp encapsulated in an extrusion according to the present invention;

FIG. 1C illustrates a wire-like electroluminescent lamp;

FIGS. 2A–2C illustrate a power unit and an electroluminescent light source according to the present invention;

FIG. 7 illustrates a perspective view of protective eye wear including at least one wire-like electroluminescent lamp according to the present invention;

FIG. 8 illustrates a tent including at least one wire-like electroluminescent lamp according to the present invention;

FIG. 9 illustrates a container including at least one wire-like electroluminescent lamp according to the present invention;

FIG. 10 illustrates a bicycle illuminated with least one wire-like electroluminescent lamp spirally wrapped according to the present invention;

FIG. 12C illustrates a party hat including at least one wire-like electroluminescent lamp according to the present invention, and a spiral pony tail holder including at least one wire-like electroluminescent lamp according to the present invention;

FIG. 13 illustrates a sign, including at least one wire-like electroluminescent lamp, adapted for use with a vehicle according to the present invention;

FIG. 18A illustrates a walking cane including at least one wire-like electroluminescent lamp according to the present invention;

FIGS. 21A and 21B illustrate bicycle seats including at least one wire-like electroluminescent lamp according to the present invention;

FIG. 27 illustrates a skateboard having a recessed power unit according to the present invention;

FIG. 28 illustrates a skateboard having a channel for recessing at least one wire-like electroluminescent lamp according to the present invention;

FIGS. 32A and 32B illustrate a vehicle including at least one wire-like electroluminescent lamp according to the present invention;

FIG. 36A illustrates recessed cup holders in a vehicle including at least one wire-like electroluminescent lamp according to the present invention;

FIG. 36C illustrates a portable cup holder including at least one wire-like electroluminescent lamp that has an independent power supply according to the present invention.

DETAILED DESCRIPTION OF PREFERRED EMBODIMENTS

The present invention incorporates wire-like electroluminescent lamps into numerous items such as safety and sports products, apparel, accessories, and vehicles.

The present invention is directed to clothing, safety and sports equipment, and accessories which include at least one wire-like electroluminescent lamp to help reduce injuries and casualties that occur with various activities and occupations such as road construction, ground crews, search and rescue operations, miners, delivery personnel, aircraft crews, crossing guards, police, firemen, traffic flaggers, railroad workers, linemen, paratroopers, paramedics, etc. In sports, the present invention facilitates safety for those who walk, bike, climb, ski, motorcycle, run, scuba, sky dive, skateboard, rollerblade, etc. to become visible or to help in a rescue effort if need be. Further, the invention is directed to any product that is used in poor lighting, such as tents, cup holders, etc.

First Embodiment

According to a first embodiment of the present invention, a wire-like electroluminescent lamp 2 may be accommodated in a transparent or semi-transparent sleeve 4A, such as the plastic sleeve shown in FIG. 1A, to facilitate securing the electroluminescent lamp 2 to a product. The sleeve 4A may be permanently or temporarily secured to the product by adhesive, Velcro, stitching, support loops, or other suitable means. The lamp may be placed in a transparent or semi-transparent sleeve 4B when the sleeve is secured to the product or after the sleeve is secured to the product. The sleeve may provide for removal of the lamp 2.

As shown in FIG. 1B, the wire-like electroluminescent lamp 2 may also be encapsulated in a transparent or semi-transparent extrusion 4B, according to known techniques, to provide additional protection for the lamp 2 to improve its durability. The lamp 2 encapsulated in the extrusion 4B may be permanently or temporarily secured to the product by adhesive, Velcro, stitching, support loops, or other suitable means. Both the sleeve 4A and the extrusion 4B may be clear, colored or multi-colored to further enhance the effect of the electroluminescent lamp 2.

FIG. 1C illustrates the wire-like electroluminescent lamp 2. In appropriate situations, the lamp 2 may be secured by adhesives, resins, heat welding, lamination, stitching and other conventional fastening means.

Securing a wire-like electroluminescent lamp 2 to a product through any of the above mentioned methods is an effective way to illuminate safety equipment such as road barriers and cones, persons wearing clothing, apparel, and products frequently used during low visibility conditions. The uniqueness of the wire-like electroluminescent lamp 2 grants the flexibility of design, allowing the electroluminescent lamp to be as one with the product.

Figure 2B:
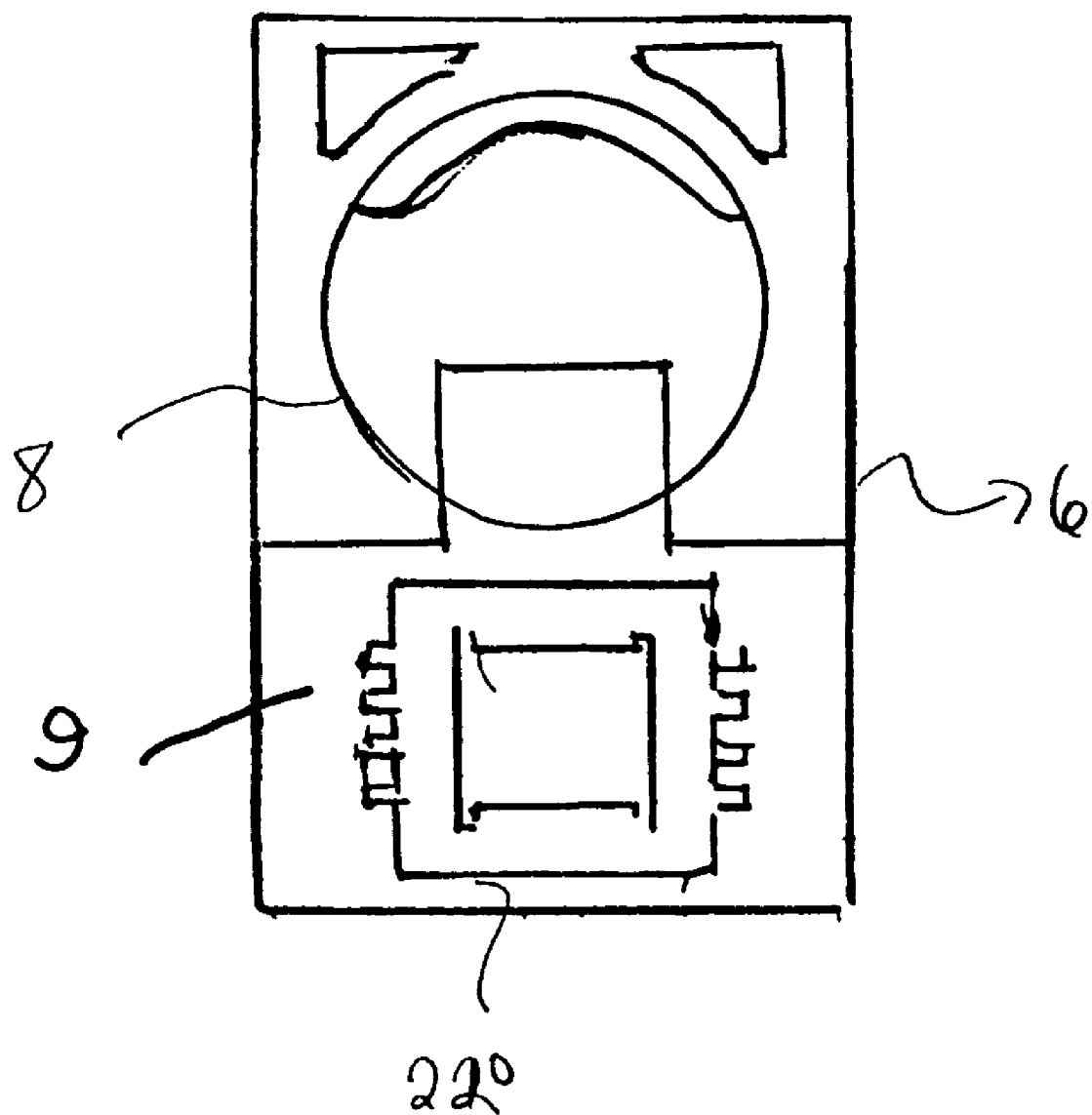
Figure 2C:
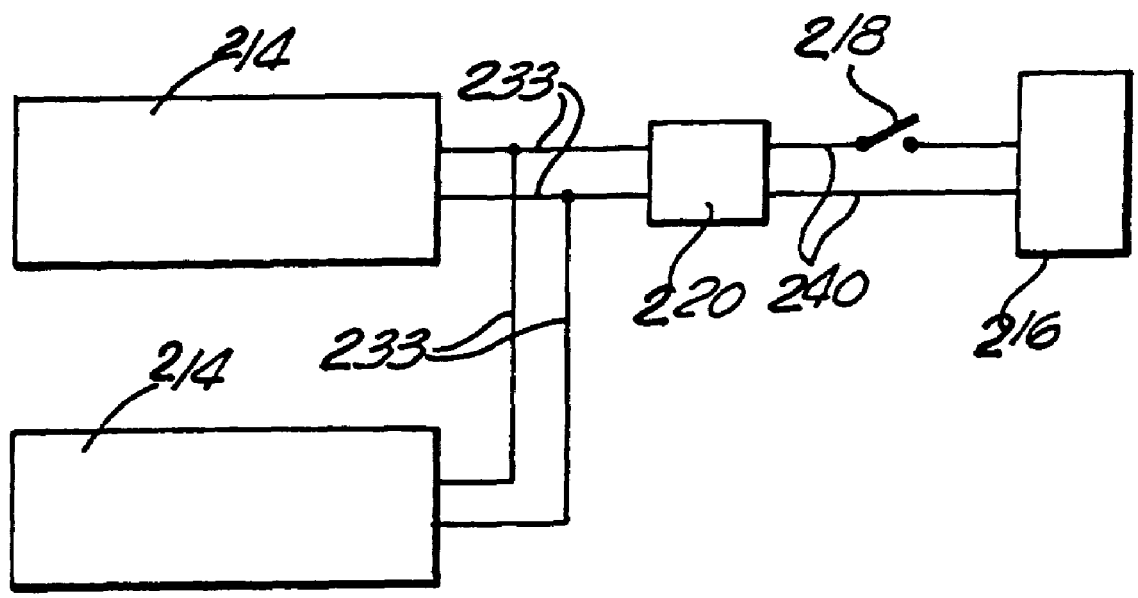

Referring to FIGS. 2A–2C, the wire-like electroluminescent lamp 2 is connected to a power unit 6 via leads (FIG. 2C, 240). The power unit 6 may be arranged within, or attached to various locations of the product with adhesive, Velcro, snaps, or other suitable fastening means. Therefore, the power unit 6 may be either temporarily or permanently secured to the product.

The power unit 6 includes a battery 8, which may be a rechargeable battery or a replaceable battery. The size of the battery 8 and the specifications of power unit 6 depend on the end use application of the lamp 2, as is known in the art. The power unit also includes an inverter 220 for converting the DC power from the battery to AC power to turn ON the electroluminescent lamp. The power unit 6 may further include an access door 9 (shown in FIG. 2B), female contacts for connecting the power unit to a recharger (not shown), and an ON/OFF switch 218 (shown in FIG. 2C).

The electronics of the power unit are illustrated in FIG. 2C. The ON/OFF switch 218 is placed between a power source 216 and the inverter 220 in order to allow the user of the product to turn the electroluminescent lamp ON or OFF positions. The ON/OFF switch 218 may be a two position switch, a dimmer switch, a switch capable of causing on and off flashing, a remote control switch, or any other suitable control switch that may cause the desirable effect. The control switch may also be a manually operated switch or an automatic switch that is pre-programmed to activate and deactivate the lamp 2 in response to certain conditions, or may be photo-responsive so as to, e.g., turn ON at the onset of darkness.

The inverter 220, which converts a DC signal to an AC signal may be of conventional form, or alternatively, may be programmable or switched under microprocessor control, so that up to at least sixteen segments or individual electroluminescent lamps may be operated in a multitude of patterns. A programmable controller and inverter 220 may be an ISC 802x manufactured by Tech Lite. An 8 bit microprocessor combined with an electrically erasable read only memory (EEPROM) facilitates the execution of up to 85 discrete sequential program steps. The user may thus create programs which are stored in the memory and executed by the microprocessor.

As shown in FIG. 2C, the power source 216, inverter 220, and ON/OFF switch 218 may be assembled in one unit and one or more wire-like electroluminescent lamps 214 may be connected to the unit by leads 240. In the examples shown in FIGS. 2A–2C, the electroluminescent lamp is designed to operate on AC power. Thus, the power source 216 is preferably a DC power source such as a battery 8. If the electroluminescent lamp operates on DC power, however, the DC to AC conversion becomes unnecessary. The power unit 6 is extremely small and lightweight so that it is essentially unnoticed by the user. The power unit is not limited to the design set forth herein, and may include modifications, such as motion and impact activation.

The present invention will be described with reference to specific examples, although it is to be understood that the invention is not limited to the examples described herein.

Figure 3:
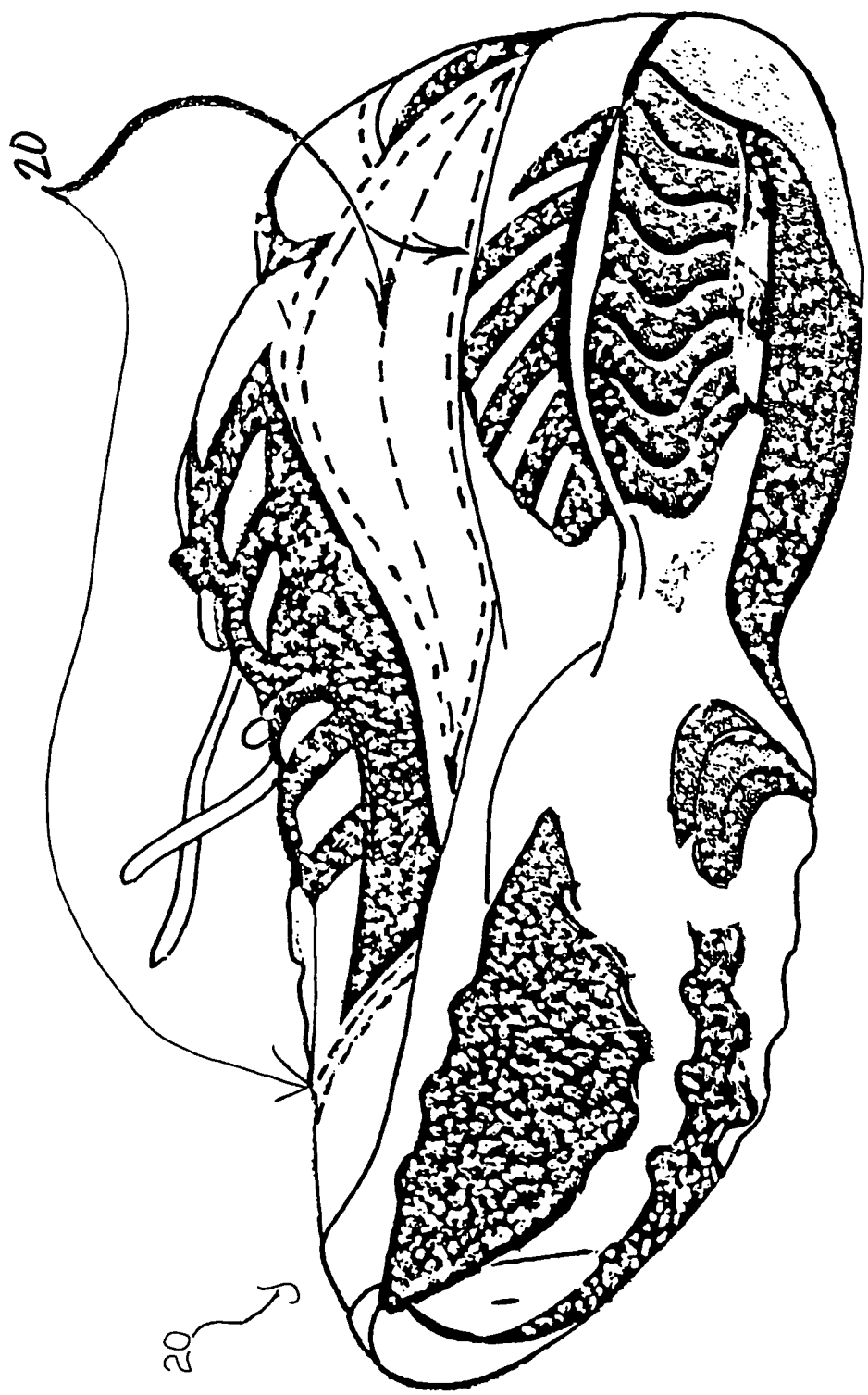
FIG. 3 illustrates footwear including at least one wire-like electroluminescent lamp according to the present invention.
Figure 22A:
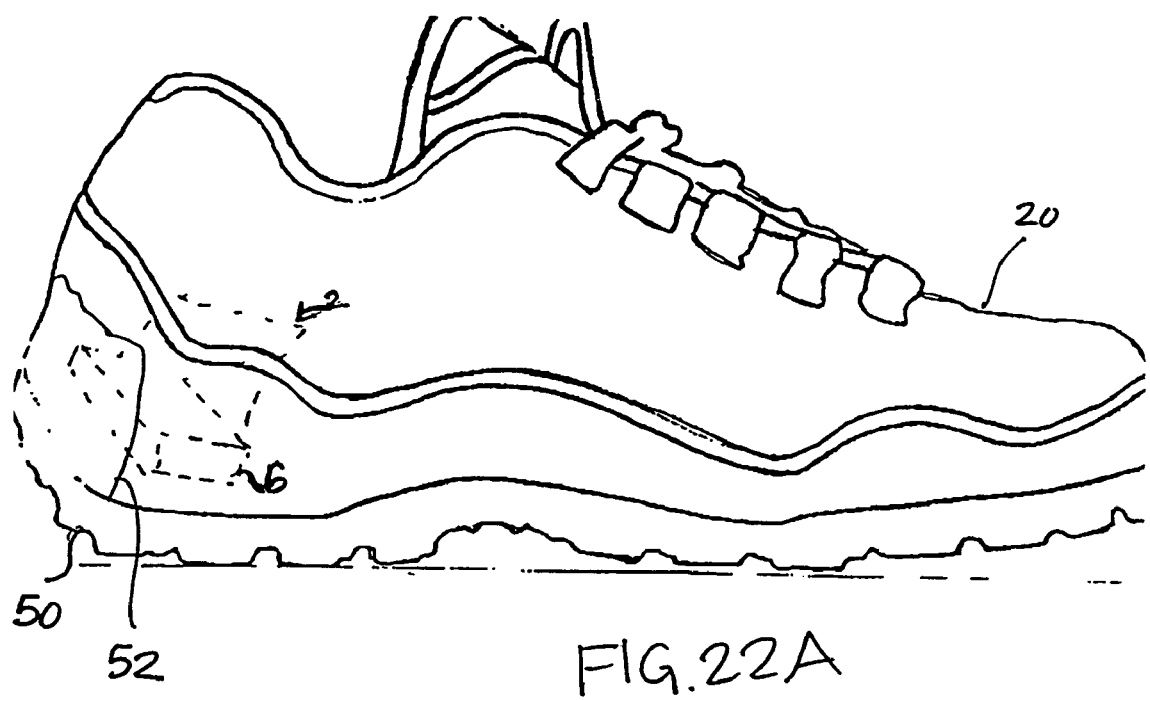
FIGS. 22A and 22B illustrate at least one wire-like electroluminescent lamp arranged in the sole of footware according to the present invention.
Figure 22B:

Referring to FIG. 3, at least one wire-like electroluminescent lamp 2 is secured to the exterior surface of a shoe 20 which may include running shoes, walking shoes, aerobic shoes, basketball shoes, tennis shoes, etc. The wire-like electroluminescent lamp 2 may be encapsulated within an extrusion 4B and secured to the shoe, or accommodated in a sleeve 4A, which is secured to the shoe, to facilitate securing the lamp to the product. The lamp 2, encapsulated in an extrusion, may also be accommodated in a sleeve 4A to enhance durability. The wire-like electroluminescent lamp 2 may be arranged in various designs or patterns, including words or letters. The wire-like electroluminescent lamp 2 itself, or the encapsulated lamp 2, or the lamp 2 accommodated in a sleeve 4A, may be secured to the shoe 20 with an adhesive, Velcro, snaps, plastic binding, or other suitable means. Therefore, the wire-like electroluminescent lamp arrangement may be designed to be removable or permanent. According to this embodiment, the power unit 6 may be arranged in or on various locations on the shoe 20, such as comfortably underneath the inner surface of the sole of the shoe in an area under the heel, as shown in FIG. 22B.

The wire-like electroluminescent lamp 2 may be arranged in virtually any design to enhance the appearance of the shoe 20, or any other product, and improve visibility of the wearer.

Figure 4:
FIG. 4 illustrates an article of clothing including at least one wire-like electroluminescent lamp according to the present invention.

Referring to FIG. 4, a wire-like electroluminescent lamp 2 is shown secured to clothing such as a jacket 22. The electroluminescent lamp 2 may be secured to other types of apparel including sweat jackets, wind breakers, vests, pants, shirts, rain jackets, etc., and therefore the invention is not limited to a specific type of apparel. As noted above, the lamp 2 itself or the lamp encapsulated in an extrusion may be secured to the product, or the wire-like electroluminescent lamp 2 or the encapsulated lamp 2 may be accommodated in a sleeve 4A and secured to the material. In addition, the wire-like electroluminescent lamp 2 may be housed in a plastic or mesh pocket-like area 24 or secured by adhesive, Velcro, snaps, or other suitable fastening means. Once again, the wire-like electroluminescent lamp 2 may be arranged in virtually any design including forms of lettering. The wire-like electroluminescent lamp 2 may also be secured to other articles of clothing such as shorts, hats, etc. in a similar fashion.

In the example illustrated in FIG. 4, the power unit 6 is arranged in the pocket area 24. However, the power unit 6 may be arranged in other convenient locations, as may the electroluminescent lamps 2. In applications for articles of clothing and apparel, the lamp 2 and the power unit 6 may be removed to facilitate laundering. Therefore, the lamp 2 and the power unit 6 may be temporarily secured to the product via a suitable fastening means, or the lamp 2 and/or the power unit 6 may be housed in a mesh cloth which may be secured to the product.

The wire-like electroluminescent lamp 2 may be secured to other articles to be worn in a similar fashion as stated above, such as back packs, gym bags, equipment bags, umbrellas, and waist packs worn by joggers and pedestrians. The power unit 6 may be arranged in a variety of locations, as also previously described.

Figure 5D:
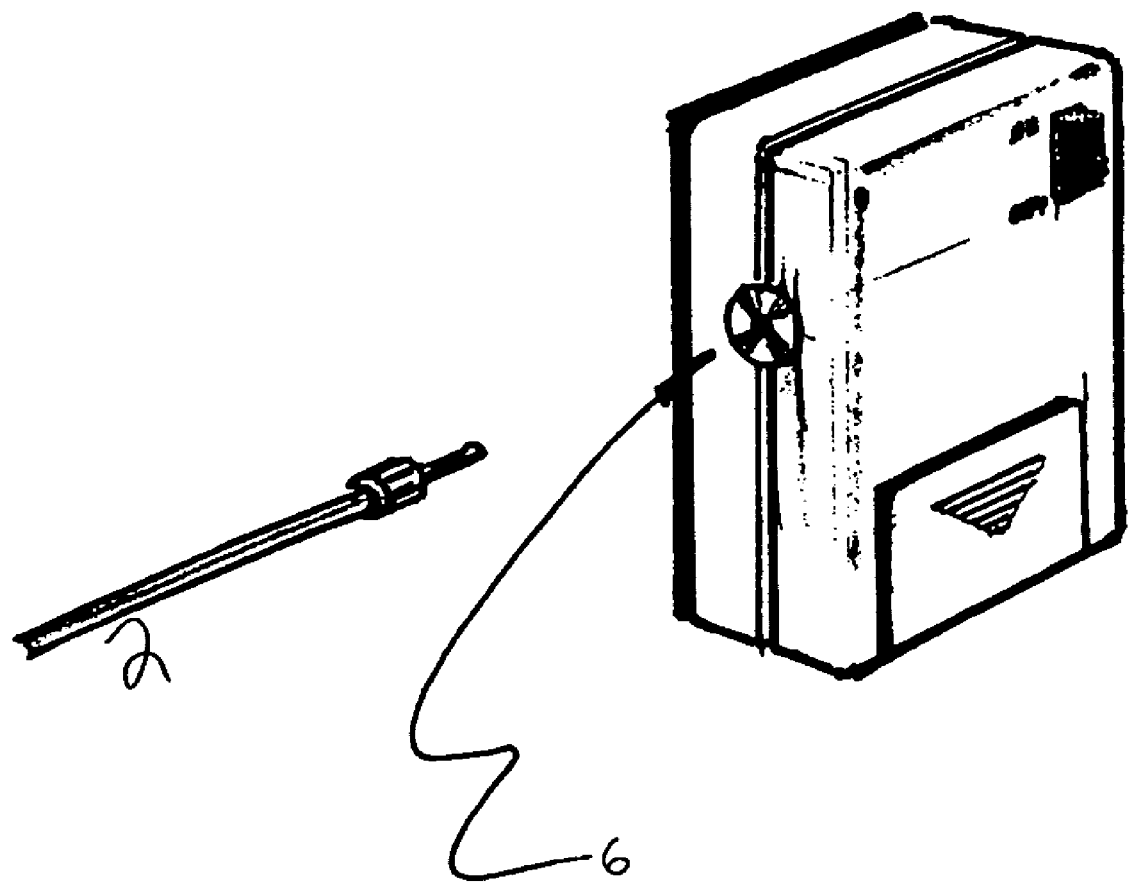
FIGS. 5A and 5B illustrate a front view of a life vest including at least one wire-like electroluminescent lamp according to the present invention.

Perhaps the greatest use for the wire-like electroluminescent lamps is in the area of safety. Referring to FIGS. 5A and 5B, at least one electroluminescent lamp 2, either flat or wire-shaped, is secured to a vest or life jacket/preserver 30. The wire-like electroluminescent lamp 2 and power unit 6 may be secured to the vest/life jacket/preserver 30 in any manner described above. The wire-like electroluminescent lamp illumination provides high visibility to the user, and therefore, increases the safety of the user, as well as assists in locating victims during rescue efforts.

Figure 6:
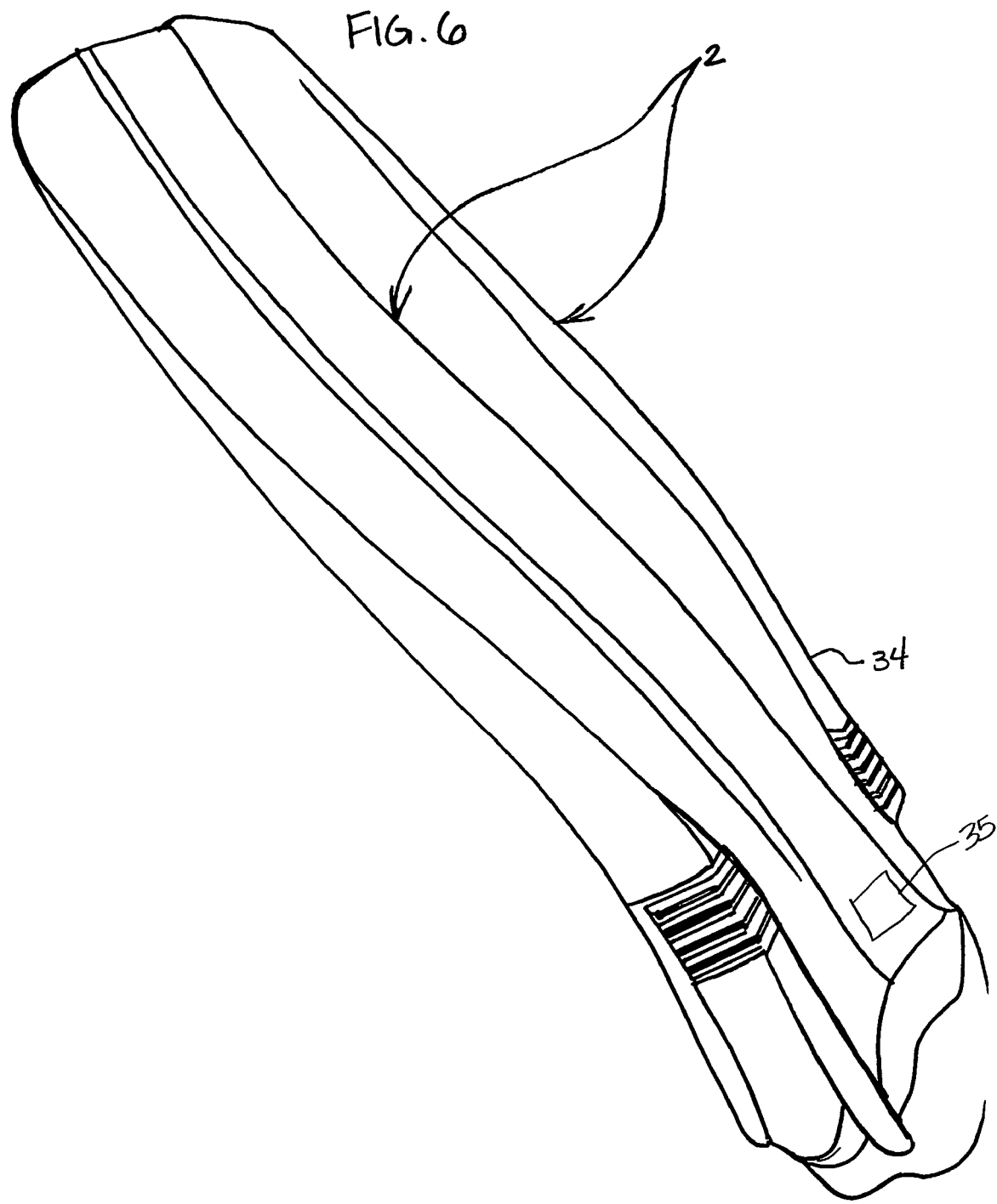
FIG. 6 illustrates a diving fin including at least one wire-like electroluminescent lamp according to the present invention.

Electroluminescent lamps 2 may also be secured to diving gear, such as wet suits, diving fins, goggles, and diving tanks, for example. The diving fins 34 and goggles 36 are illustrated in FIGS. 6 and 7, respectively. The power unit 6 may be housed in a pocket 35 arranged on the diving fins 34 or on a band on the side of the goggles, for example. The power unit 6 may be secured at any convenient location by appropriate fastening means. The wire-like electroluminescent lamp 2 not only provides ornamentation to the product, but also provides high visibility of the user, and therefore, increases the safety of the user.

The use of a transparent or semi-transparent sleeve 4A and/or extrusion 4B, for attachment of an electroluminescent lamp 2, extends to any type of material or product that provides increased utility when visible in hard to see places. Other examples include a tent 40, as shown in FIG. 8, and a container 46, such as a tackle/tool box, as illustrated in FIG. 9. Referring to FIG. 8, at least one wire-like electroluminescent lamp 2 may be arranged in a transparent or semi-transparent sleeve 4A or extrusion 4B, and secured to the seams 42 of the tent, by any conventional fastening means. The lamp 2 may also be secured to mesh which holds the poles that support the tent 40. This enhances visibility of the tent 40 on cloudy days and at night. Further, the electroluminescent wire 2 may be placed within or secured to the shock corded aluminum or PVC poles to radiate light from the poles that support the tent.

Referring to FIG. 9, at least one wire-like electroluminescent lamp 2 or flat electroluminescent lamp, may be arranged in a transparent or semi-transparent sleeve 4A, and/or encapsulated in an extrusion 4B and designed into any shape. The protective sleeve 4A and/or the power unit 6 may include adhesive backing that is exposed by a peel away cover and applied with pressure to adhere. Thus, the lamp 2 and/or the power unit 6 may be permanently or temporarily secured to the container 46, or any other object, by the adhesive or other conventional fastening means. When used in a utility box, for example, this type of lamp 2 allows the user to see equipment without being blinded by the intense brightness of a halogen lamp or fluorescent bulb. The power unit 6 may be permanently or temporarily secured to the container 46 using methods previously discussed.

There are several other beneficial uses of the electroluminescent lamp 2. For example, as illustrated in FIG. 10, a wire-like electroluminescent lamp 2 is placed on a bicycle in a spiral formation to illuminate the bicycle during low light conditions. The wire-like lamp 2 may be encapsulated in an extrusion 4B or accommodated in a sleeve 4A. The lamp 2 may be encapsulated in a substantially flat extrusion which can be wrapped about a portion or portions of an article, such as the bicycle, jump rope, pet leash or collar, etc., to provide seamless illumination. The lamp 2 may also be accommodated in a substantially flat sleeve which can be wrapped about a portion or portions of an article. The lamp 2 and power unit 6 in this example constitute a retrofit unit. The lamp 2 and power unit 6 may be either temporarily or permanently secured to virtually any article by a sufficiently strong and compatible adhesive, or any other suitable fastening means. Commercially available examples of such adhesives include Spray Mount artist adhesive ID number 62-4953-4825-2, Super 77 spray adhesive ID 62-4437-4930-4, double coated transparent polyester film tape D.C. part No. 021200-13267, and 5 mil high performance adhesive transparent tape with P/C liner D.C. part No. 012100-91055. These products are manufactured by the 3M Company.

Figure 11A:
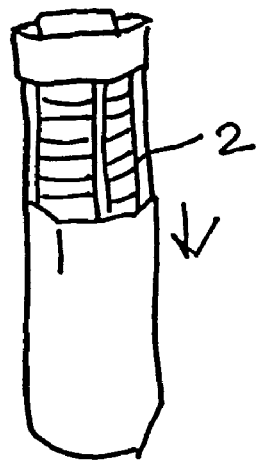
FIGS. 11A–11C illustrate lanterns illuminated with at least one wire-like electroluminescent lamp according to the present invention.
Figure 11B:
Figure 11C:
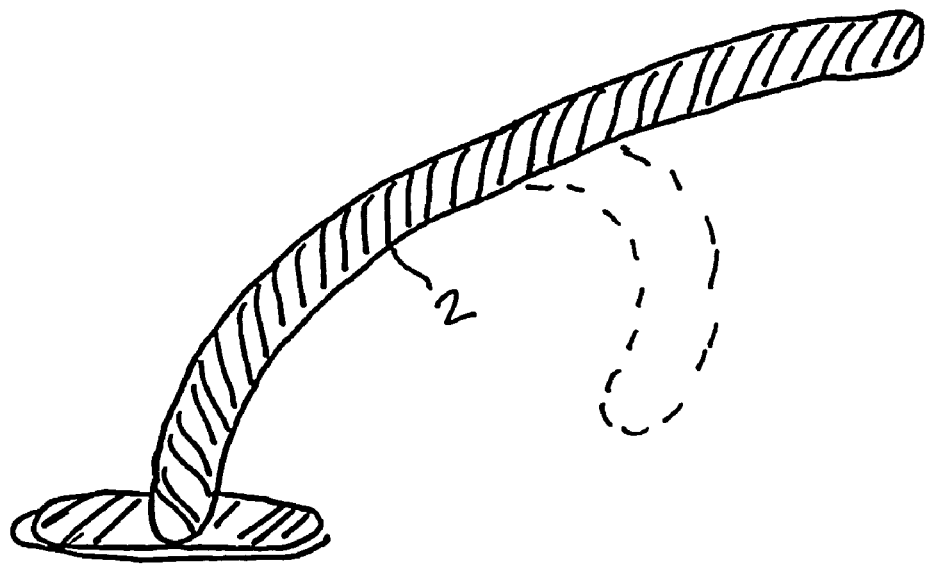

FIGS. 11A–C illustrate lanterns with an electroluminescent lamp or lamps 2. The lanterns are weather and water proof, and do not attract insects. The lantern illustrated in FIG. 11A includes a wire-like lamp 2 and it retracts into a holder for easier storage. The lantern illustrated in FIG. 11B is designed to rotate and it may be vacuum insulated within a plastic covering or other suitable material. The lantern illustrated in FIG. 11C is flexible so that it may wrap around an object and hook into position. The lantern may or may not include a base. Further, the lantern may incorporate either the electroluminescent wire light 2 or the flat electroluminescent lamp. The power unit 6 may be secured in any convenient location by conventional means.

Figure 12A:
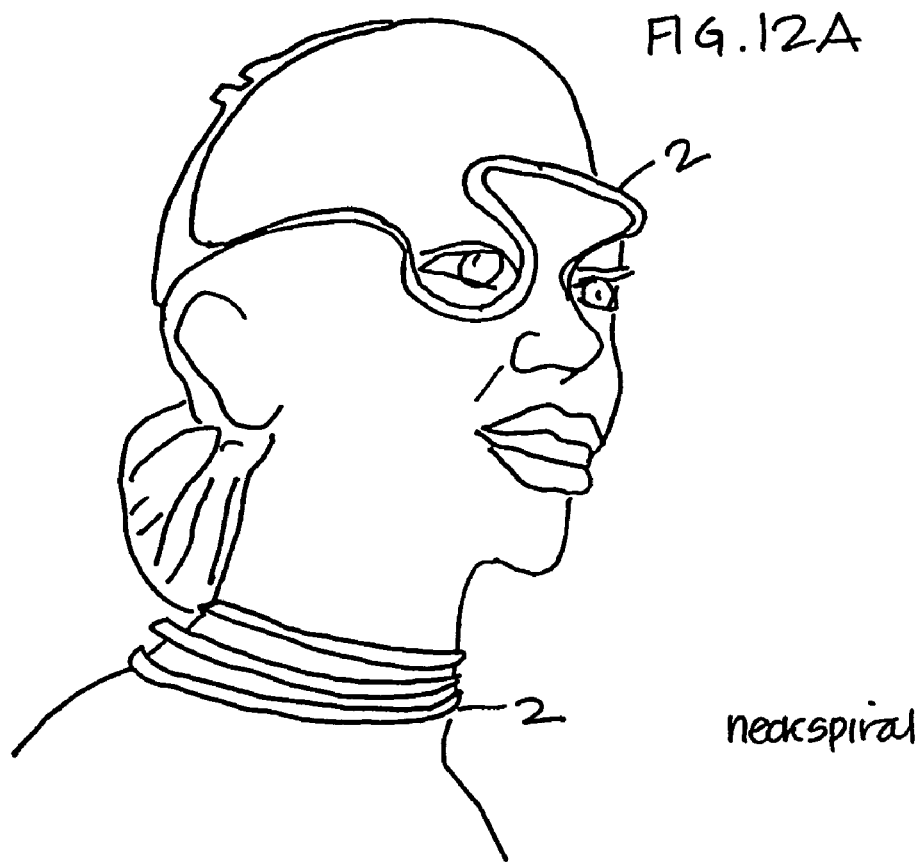
FIG. 12A illustrates a pair of party glasses including at least one wire-like electroluminescent lamp according to the present invention, and a spiral necklace including at least one wire-like electroluminescent lamp according to the present invention.
Figure 12B:
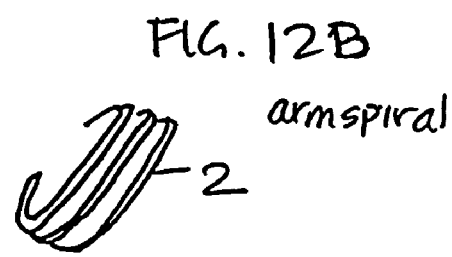
FIG. 12B illustrates an arm spiral including at least one wire-like electroluminescent lamp according to the present invention.

FIGS. 12A–B illustrate jewelry and accessories that incorporate the wire-like electroluminescent lamp 2 of the present invention. In FIG. 12A, a pair of party glasses having a wire-like electroluminescent lamp 2 are shown that are designed to fit the head and outline the eyes. A neck spiral is also shown. An arm spiral having a wire-like electroluminescent lamp 2 is shown in FIG. 12B. A wire-like electroluminescent lamp 2 housed in a sleeve 4A and/or encapsulated in an extrusion 4B may also be incorporated into hats and visors and pony-tail holders, as shown in FIG. 12C. A small power unit housing 6 coin batteries may be used to power the jewelry and accessories.

Figure 14:
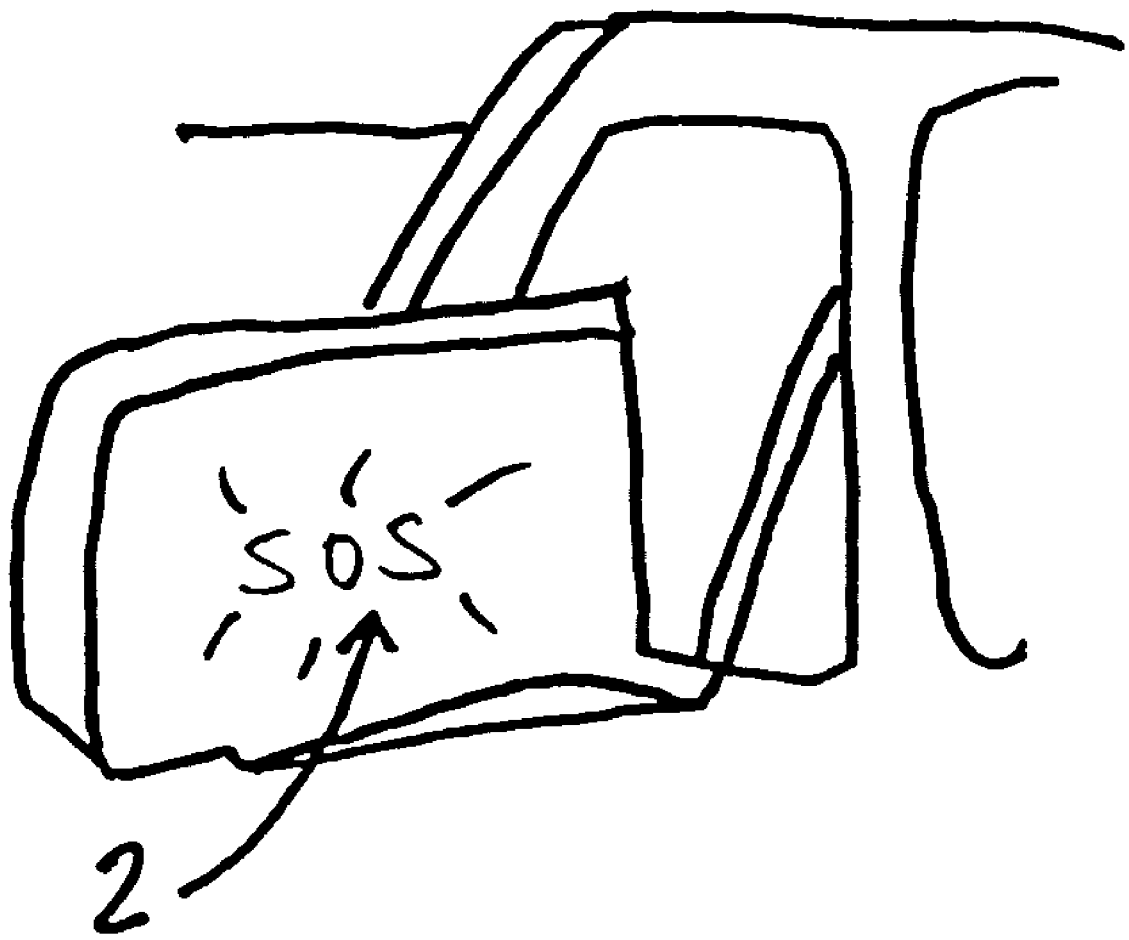
FIG. 14 illustrates a sign for a vehicle bearing a message or letter(s), including at least one wire-like electroluminescent lamp according to the present invention.

FIGS. 13–14 illustrate vehicle safety products that incorporate the present invention. More specifically, a sign in the shape of an arrow is shown in FIG. 13. Electroluminescent light from a wire light 2 or flat lamp is secured to the sign. The light may pulsate, follow in sequence, or change design to create attention and divert approaching traffic. Signs of this type may be secured to a vehicle by means of a suction cup, latch, over the window hook, or other suitable fastening means. The sign or multiple signs may also be placed proximate to the vehicle rather than on the vehicle to provide greater safety. The wire-like or flat electroluminescent light 2 may also be secured to a sun-visor or the front and rear windshields. FIG. 14 illustrates a sign for a vehicle bearing an "S.O.S." signal. The sign may be secured to the vehicle by any suitable means. In addition, the sign may be arranged to pivot from a vehicle window to indicate a need for help, or be arranged proximate the vehicle. The signal provides high visibility for oncoming traffic, particularly when arranged at eye-level. It is made of plastic or vinyl type material and illuminates a message by incorporating at least one electroluminescent light. The lamp 2 is placed on top of or sandwiched between the transparent plastic coverings. The lamp electronics may be connected to a 12 volt car battery as a power supply or include an independent power unit. Further, the sign may be manufactured as a part of the vehicle, or separately attached to the rain trim, window, or door of the vehicle.

Figure 15:
FIGS. 15A and 15B illustrate a headband including at least one electroluminescent lamp and use of at least one wire-like electroluminescent lamp over articles of clothing according to the present invention.
FIG. 15C illustrates a power unit used in FIGS. 15A and 15B.
FIG. 15D illustrates a power unit and a wire-like electroluminescent lamp according to the present invention.

Another safety use of the wire-like electroluminescent lamp 2 is in the field of athletic apparel and accessories. FIG. 15A illustrates a headband illuminated by an electroluminescent wire 2. FIG. 15B illustrates an electroluminescent wire-like lamp 2 that is long enough to wrap across or around a chest or appendage, effectively spiraling the body for 360 degrees of illumination. This method of wearing the lamp 2 allows the user to perform unlimited activities without feeling weighed down by the lamp 2. The electroluminescent wire 2 may also be secured to mesh cloth that is secured onto shirts and shorts, for example, to be worn over regular articles of clothing. In this manner, any article of clothing or accessory may include illumination from electroluminescent lamps 2.

These products may be worn at dusk or at night to increase visibility, and thus, increase the safety of the user. The electroluminescent wire 2 may be easily interchanged with replacement wires and is available in a variety of colors. Multiple lamps may also be used. Both the headband and the body spiral may operate on internal battery power or from an independent power unit that may be attached to a belt, as shown in FIG. 15C.

FIG. 15D illustrates the power unit 6 having a "jack" connector for connecting the electroluminescent lamp 2. The "jack" connector consists of male and female connecting parts that are known in the art, similar to a headphone jack. In the present invention, the use of a jack allows the wire-like electroluminescent lamp 2 or the power unit to be easily interchanged when the light is dimming, when the lamp 2 wears out, or when the user desires to change the color of the lamp 2. Further, although FIG. 15D illustrates only one jack, multiple jacks may be arranged on the power unit so that multiple wire-like electroluminescent lamps 2 may be illuminated at one time, having the same or different colors.

Figure 23:
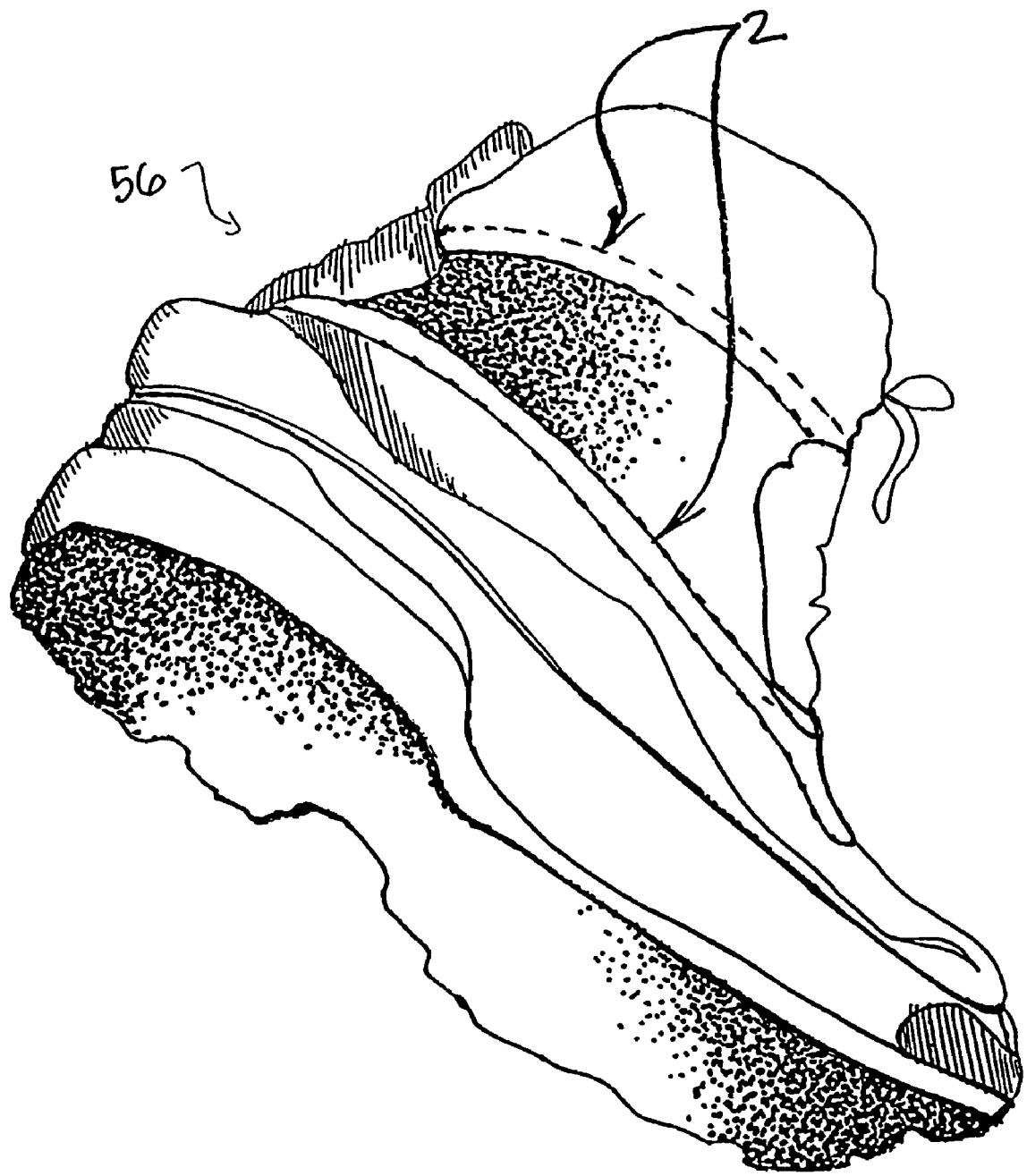
FIG. 23 illustrates a boot including at least one wire-like electroluminescent lamp according to the present invention.
Figure 24:
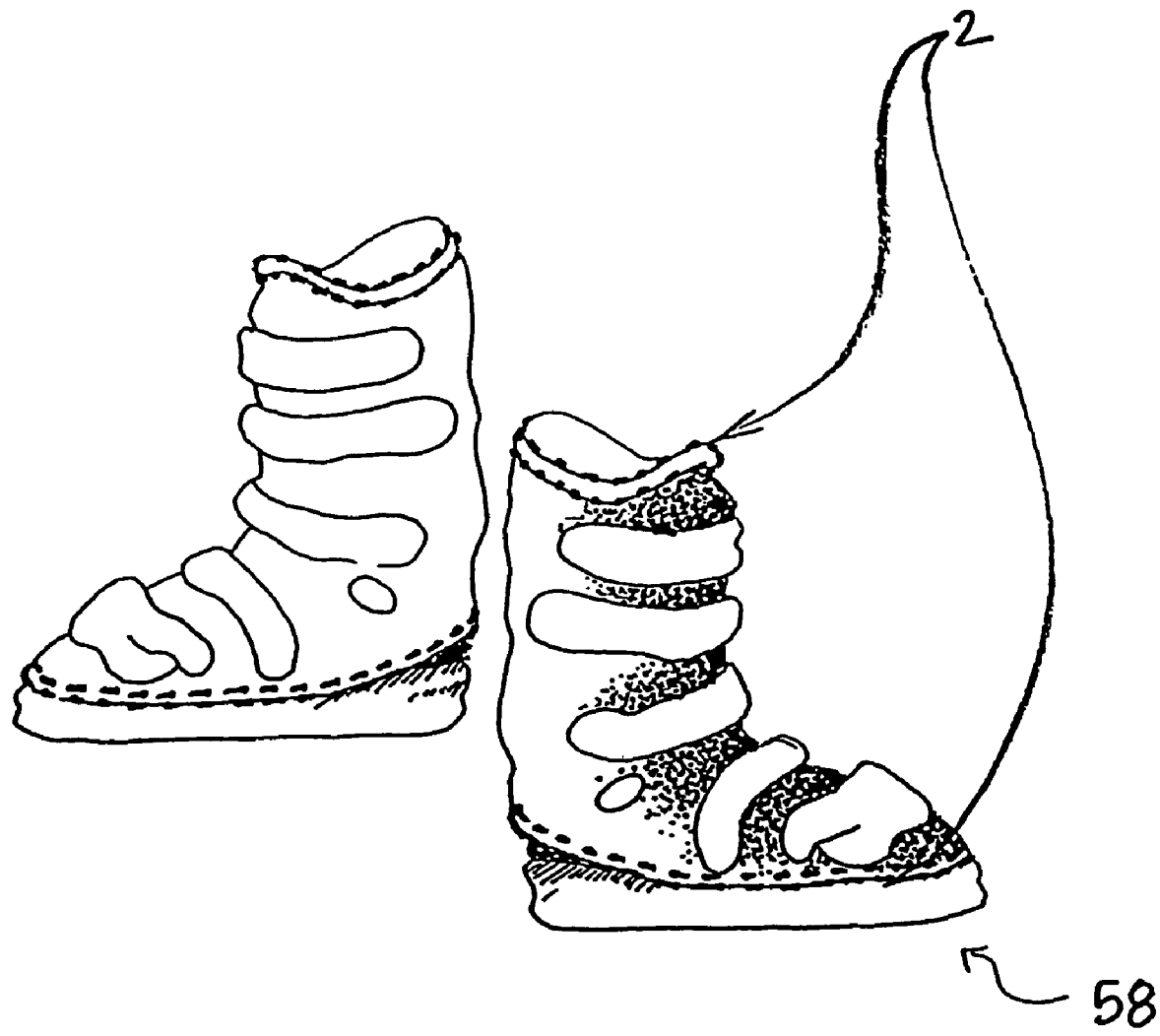
FIG. 24 illustrates a side view of ski boots including at least one wire-like electroluminescent lamp according to the present invention.
Figure 25:
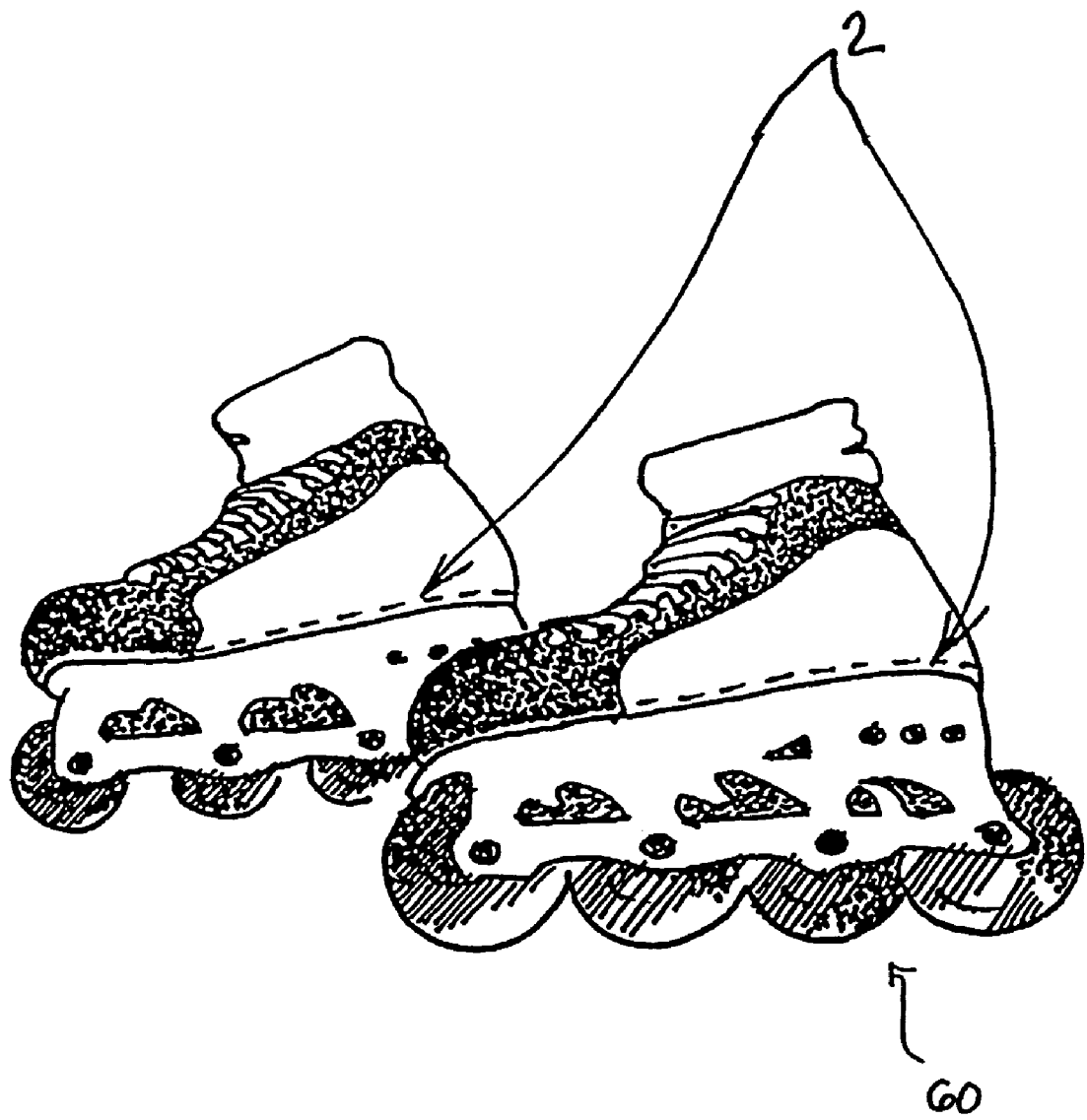
FIG. 25 illustrates a pair of in-line skates including at least one wire-like electroluminescent lamp according to the present invention.

At least one electroluminescent lamp 2 may also be secured to a boot 56, shown in FIG. 23, ski boots 58 in FIG. 24, skates 60 shown in FIG. 25, by the methods set forth above. The power unit 6 may be either permanently or temporarily secured to the items shown in FIGS. 23–25 by the methods set forth above.

Figure 16A:
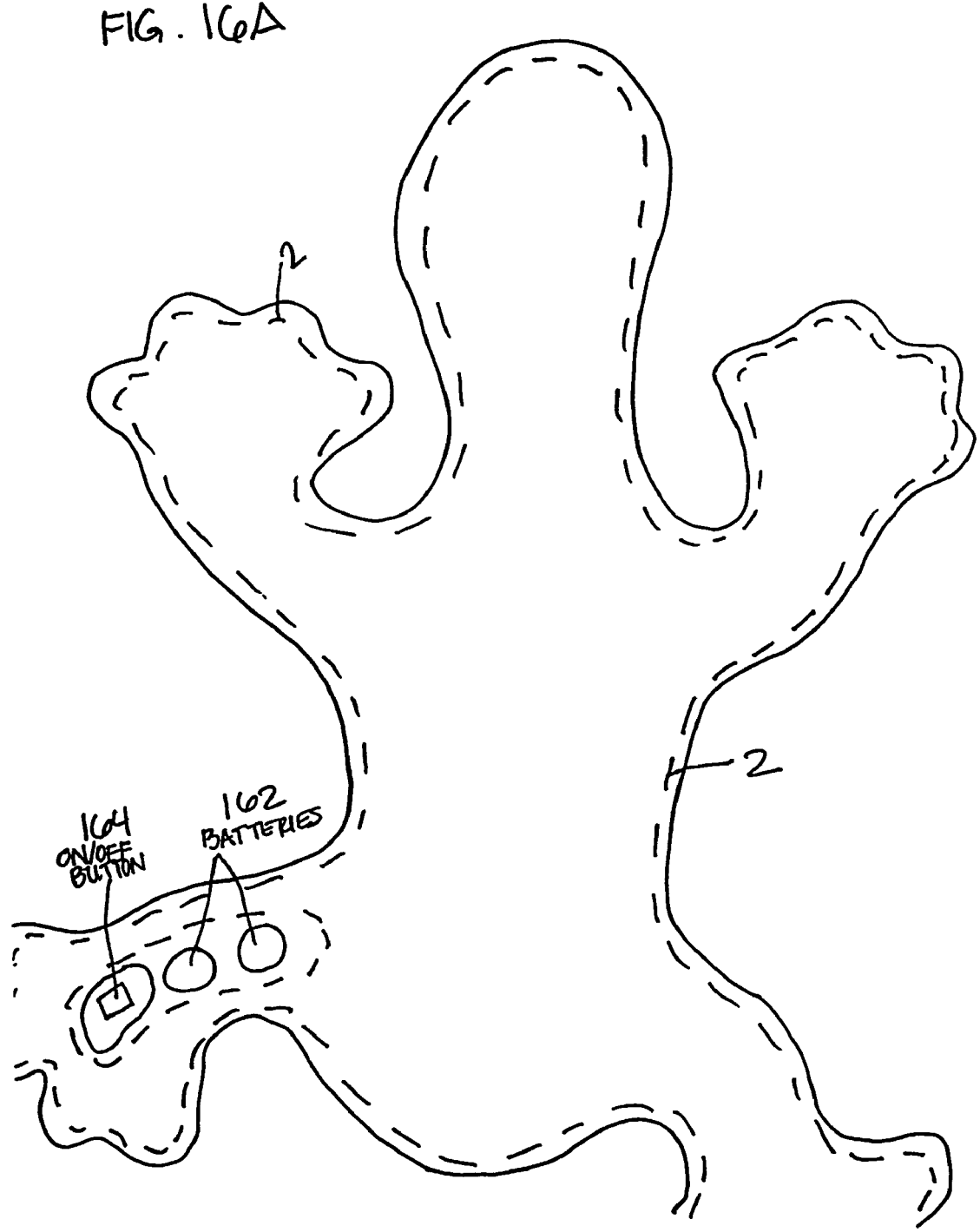
FIG. 16A illustrates a plush, squeezable toy including at least one wire-like electroluminescent lamp according to the present invention.
Figure 16B:
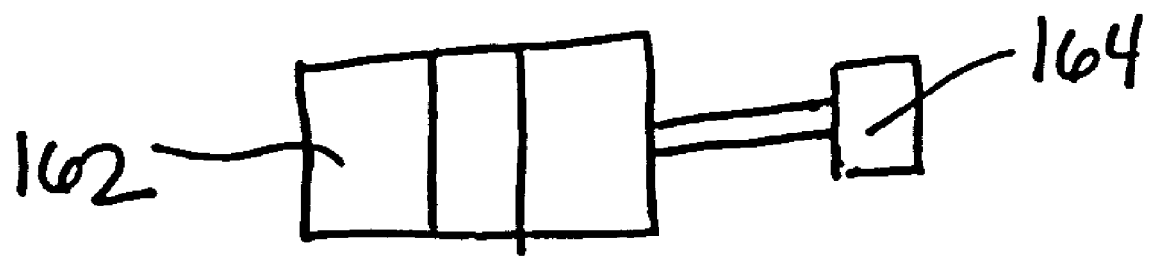
FIG. 16B illustrates the power unit and control switch of the toy of FIG. 16A.

FIGS. 16A–B illustrate a plush, squeezable toy that incorporates the present invention to provide an ideal night light for children. FIG. 16A shows the squeezable toy, which is corded with electroluminescent wire 2, encapsulated in an extrusion 4B, silhouetting the design of the toy. The lamp 2 may be used without being encapsulated in an extrusion. The toy illuminates a soft light powered by a power unit 162 recessed into a pocket housed in the toy with an ON/OFF switch or push button 164, as shown in FIGS. 16A–B. The bottom or arm of the switch 164 protrudes through the surface of the toy so that it can be easily activated. The lamp 2 may be arranged in a variety of designs, patterns, including logos and lettering. The lamp 2 may be housed in a transparent or semi-transparent sleeve 4A (with or without color(s)). The electroluminescent lamp 2 can also be used on the bumpers of a crib or portions of a crib or cradle to illuminate areas of the crib or cradle. The lamp and power unit may be secured to the toy by any of the methods set forth above or appropriate conventional means.

Figure 20A:
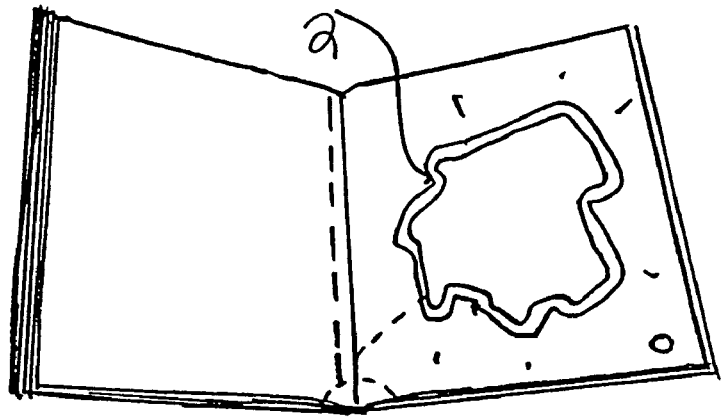
FIGS. 20A and 20B illustrate a book with at least one wire-like electroluminescent lamp built into the book according to the present invention.
Figure 20B:
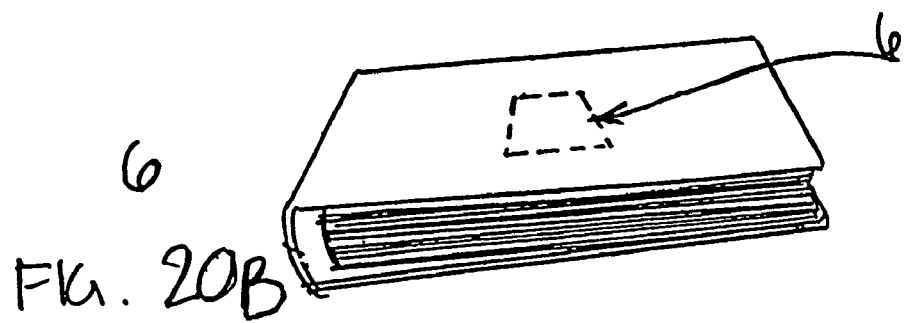

Wire-like or flat electroluminescent lamps 2 may also be incorporated into other children's toys and accessories such as jump ropes and doll houses (not shown). A children's book with an electroluminescent wire 2 or flat light built into the book and story line is shown in FIG. 20A. An ON/OFF switch is provided to allow for participation, and the battery pack is housed in the spine of the book and/or the cover of the book, as shown in FIG. 20B. Another children's toy that may be illuminated by an electroluminescent lamp 2 is a doll house (not shown).

Figure 17:
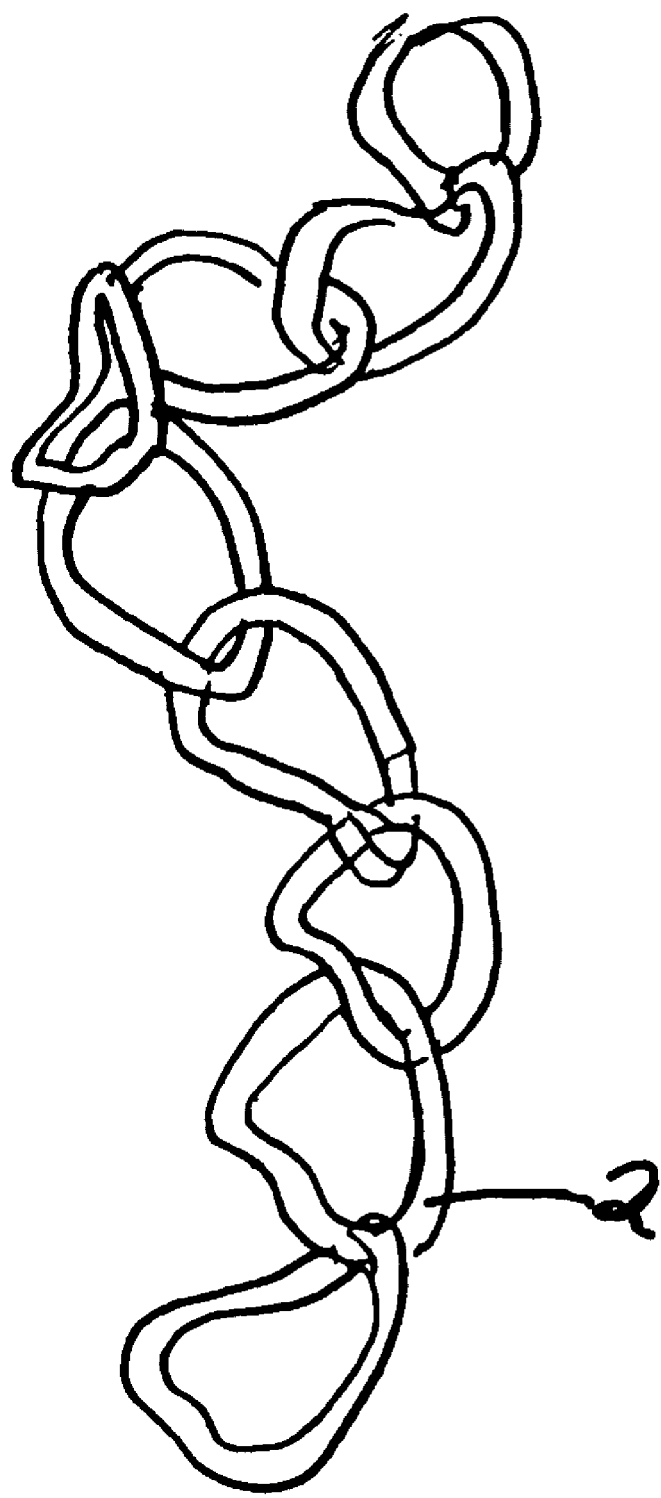
FIG. 17 illustrates a chain link including at least one wire-like electroluminescent lamp according to the present invention.

FIG. 17 illustrates a PVC plastic chain link having electroluminescent wire that is threaded or woven as part of the chain to generate a flashing or continuous light. This product easily conveys partitioning or separation of an area and may be powered by a power unit or electrical outlet.

Figure 18B:
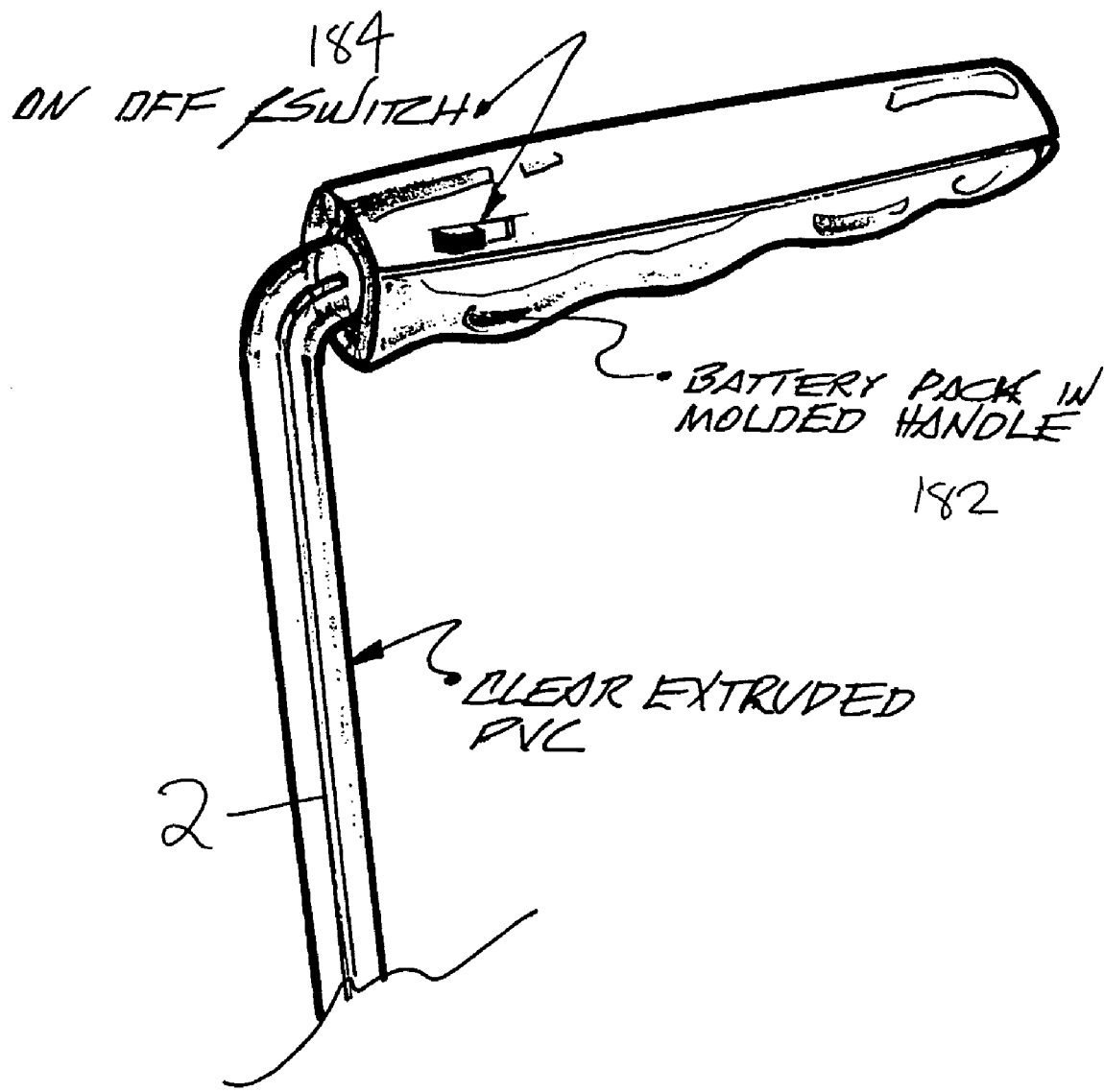
FIG. 18B illustrates a handle including a power unit of the cane of FIG. 18A.

A clear, PVC walking cane incorporating electroluminescent wire for greater visibility is shown in FIG. 18A. A power unit 182 having an ON/OFF switch 184 is encased in the handle or secured to the outside of the cane, as shown in FIG. 18B.

Figure 19:
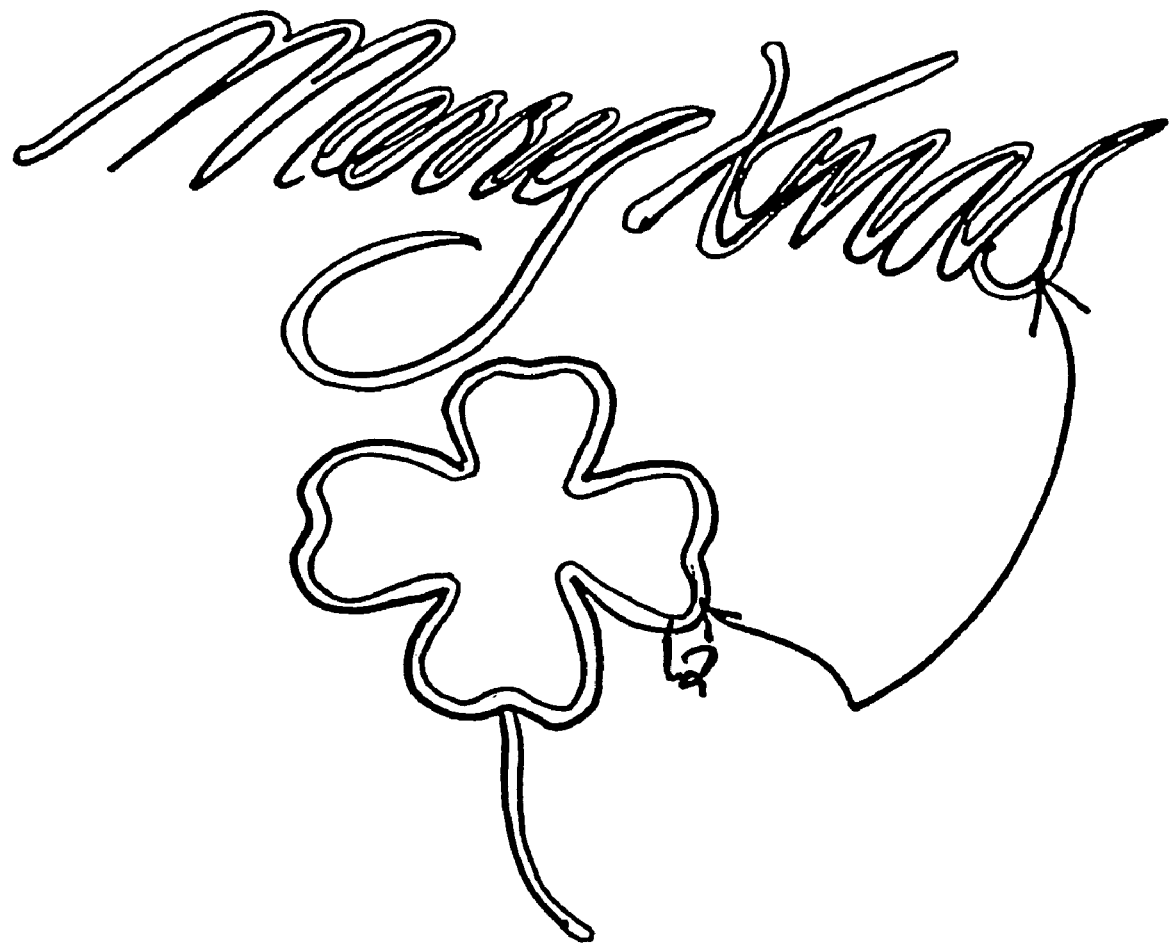
FIG. 19 illustrates holiday decorations including at least one wire-like electroluminescent lamp according to the present invention.

FIG. 19 illustrates a holiday decoration for a door, wreath, lawn display, mail box, or tree ornamentation that is illuminated by a wire or flat electroluminescent lamp 2. The electroluminescent lamp may also be used as a sign or added to a sign which conveys a message. The electroluminescent lamp may be formed into the desired shape by die molding or the like. The decoration may or may not be encased in PVC housing, and the sleeve 4A and/or extrusion 4B may be transparent or have color. Further, the decoration may be powered by a standard electrical outlet hook up or by a power unit secured to the back of the decoration with suction cups, Velcro, or any other suitable means. The electroluminescent lamp may be secured to structures to provide indoor or outdoor illumination.

Figure 21B:
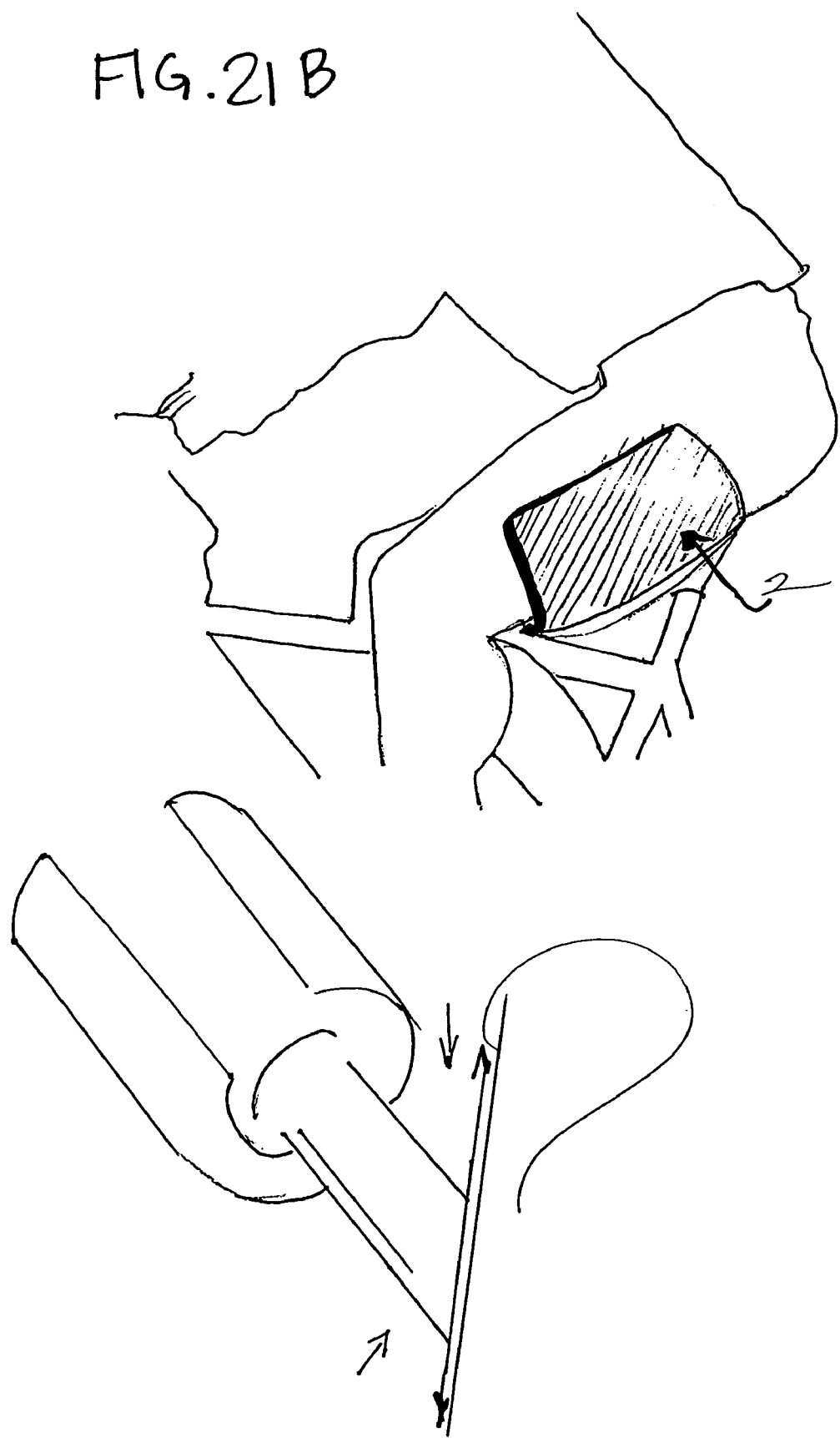

FIGS. 21A–B illustrate bicycle seats that are illuminated by electroluminescent light 2. In FIG. 21A, the seat supports the buttocks by circle-like supports to remove pressure from a male's prostate, creating a more comfortable seat. In FIG. 21B, a seat in the shape of a hot dog bun envelopes the thigh part of a leg to increase mobility and flexibility and to relieve the pressure from the prostate. The seats illustrated in both figures are lighted by at least one electroluminescent lamp 2 for design and safety purposes. Another example of a safety use of the present invention is to secure the wire-like electroluminescent lamp 2 to a carriage, buggy, or wheeled-chair (not shown). The wire-like electroluminescent lamp 2 may be included in a transparent or semi-transparent sleeve 4A and/or encapsulated in an extrusion 4B, and sewn to the material of the carriage, or it can be secured by the additional methods described herein and conventional fastening means. Again, the power unit 6 may be arranged in a pocket area or other convenient location as previously described.

The electroluminescent lamp may be secured to ladders, and safety nets.

Second Embodiment

Another method for securing the electroluminescent lamp 2 to a desired object is to implant or insert it within the desired material. As illustrated in FIGS. 22A–B, both the wire-like electroluminescent lamp 2 and the power unit 6 may be arranged within the sole 50 of a shoe 20. The sole 50 may include a transparent area 52 corresponding to the location of the wire-like electroluminescent lamp 2 such that the light from the wire-like electroluminescent lamp 2 is visible through the transparent area 52. Alternatively, the entire sole or portions of the sole may be transparent, semi-transparent, colored or multi-colored and illuminated by wire-like electroluminescent lamp 2.

The wire-like electroluminescent lamp 2 may be embedded within the boots 56, the ski boots 58 or the skates 60 respectively shown in FIGS. 23–25. The lamp may be embedded within the entire product or portions of the product which are transparent, semi-transparent, colored or multi-colored. The lamp 2 may be encapsulated in an extrusion 4B and then embedded in the product.

In addition, the electroluminescent lamps may be secured to the exterior of the above items by the means set forth in the first embodiment with respect to the sleeve or where the lamp is encapsulated in an extrusion.

Third Embodiment

Figure 26:
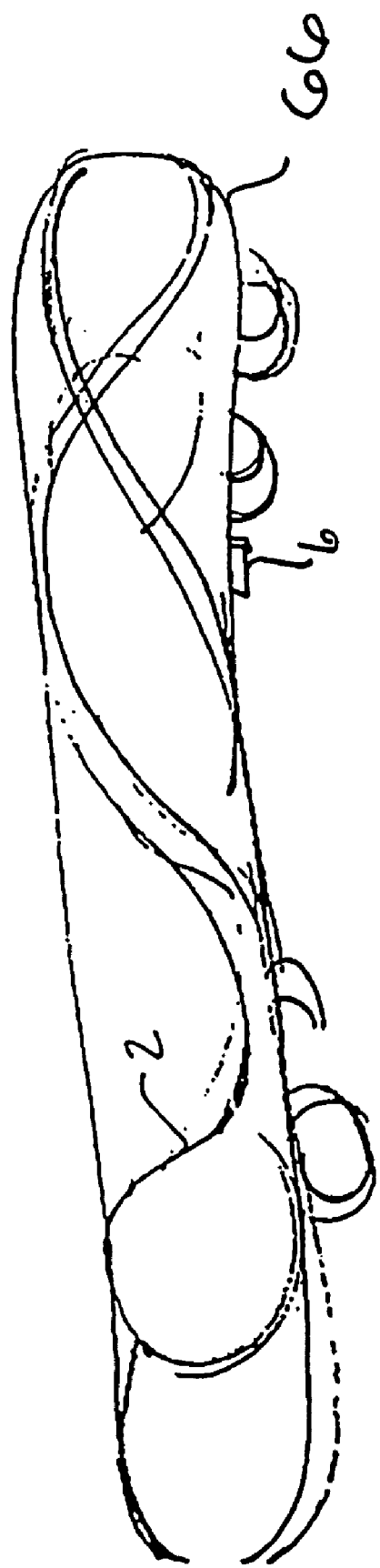
FIG. 26 illustrates a skate board including at least one wire-like electroluminescent lamp and a power unit according to the present invention.

Another application of securing the electroluminescent lamp 2 to an object for enhanced visibility is by placing it in a recessed portion or channel of any rigid surface, such as the surface of a skate board 66, as illustrated in FIGS. 26–28. Referring to FIG. 28, a wire-like or flat electroluminescent lamp 2 may be arranged in a channel 292 that is formed on the surface of the board 66 with grooves for recessing the wire-like or flat electroluminescent lamp 2. Further, a transparent or semi-transparent layer may be placed over the rigid surface 66 with the recessed lamp 2 to provide additional protection for the wire-like or flat electroluminescent lamp 2. The power unit 6 may be arranged on the exterior of the rigid surface 66, as illustrated in FIG. 26, or recessed into the rigid surface 66, as illustrated in FIG. 27.

The product may include canals or channels for cradling the lamp. The power unit 6 may also be secured to the boots 56, ski boots 58, and skates 60 in the manner described above.

Note that the wire-like or flat electroluminescent lamp 2 may also be secured to the rigid surface 66 by any of the methods previously described, such as by an adhesive, Velcro, snaps or other suitable means, and therefore is not limited to the use of recesses or channels.

The wire-like or flat electroluminescent lamps 2 may be secured to other rigid surfaces such as on jet skis, snow skis, snowboards, snow mobiles, go carts, etc., and other sports apparel and accessories in the same recessed or channeled fashion as stated above. Further, the wire-like electroluminescent lamp 2 may be housed in a sleeve 4A secured to the product. In the above embodiments, the lamp 2 may be encapsulated in an extrusion 4B for added durability. The lamp may be formed into a variety of designs and lettering, including logos and brand names, on the surface. Formation of the designs and lettering may also be achieved by using a screen printing method wherein phosphor particles are selectively placed to create a design or logo that emits light.

Figure 29:
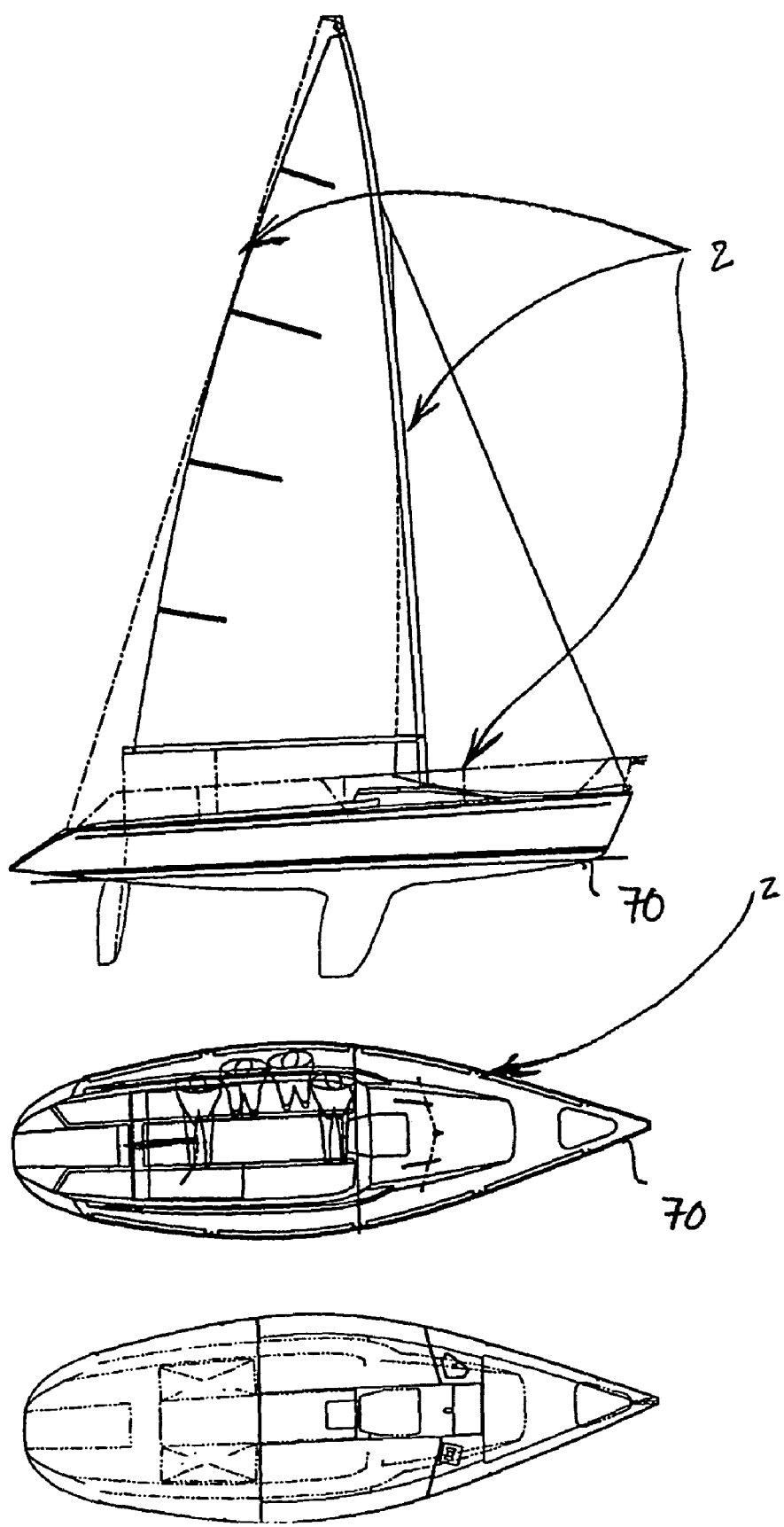
FIG. 29 illustrates a boat and/or sails including at least one wire-like electroluminescent lamp according to the present invention.

Vehicles, such as rescue boats, may also be equipped with wire-like electroluminescent lamps 2 to increase visibility of the vehicles during low light and no light conditions. FIG. 29 illustrates the wire-like electroluminescent lamp 2 secured to the exterior of a rescue boat 70 or recessed into the rescue boat 70. The electroluminescent lamps may also be secured to the sails of a boat as shown in FIG. 29, or flags arranged on the boat by means described in the first embodiment. The power unit 6 may be arranged in any convenient location and secured as previously described.

For safety vehicles, the electroluminescent lamp 2 may be arranged in the shape of a cross, or arranged to spell a word such as "rescue" to indicate that the vehicle is a rescue vehicle. The wire-like electroluminescent lamp 2 may also be secured to the surface of a vehicle by any of the methods previously described, such as by an adhesive, Velcro, snaps, or other suitable means, and therefore, is not limited to the use of recesses or channels.

Figure 30:
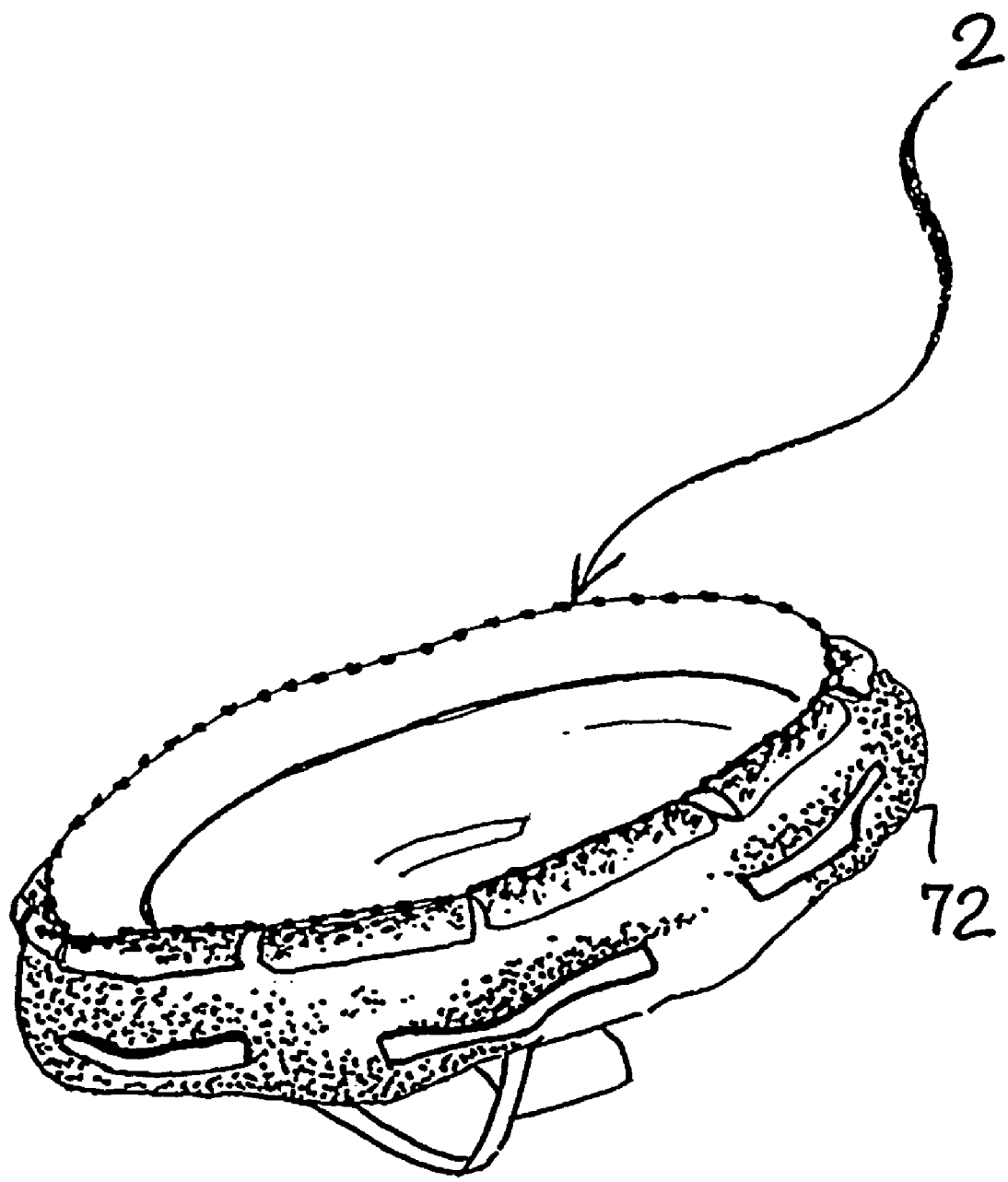
FIG. 30 illustrates a life raft/dinghy including at least one wire-like electroluminescent lamp according to the present invention.
Figure 31A:
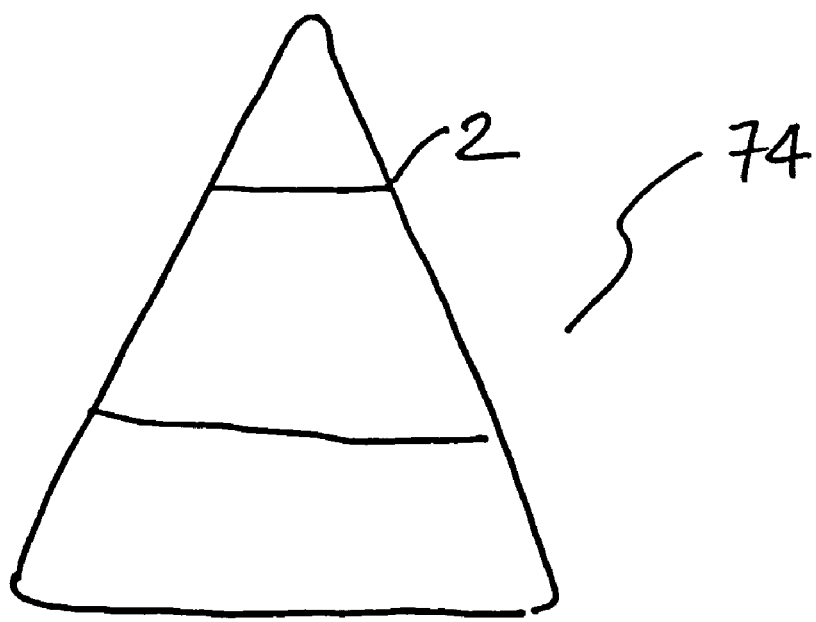
FIGS. 31A and 31B illustrate a traffic barrier including at least one wire-like electroluminescent lamp according to the present invention.
Figure 31B:
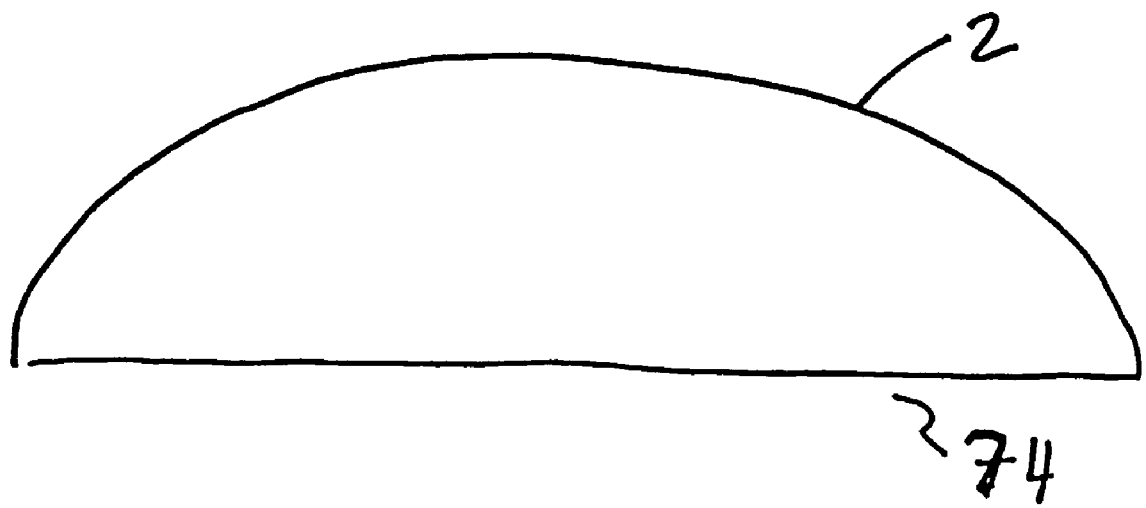
Figure 33A:
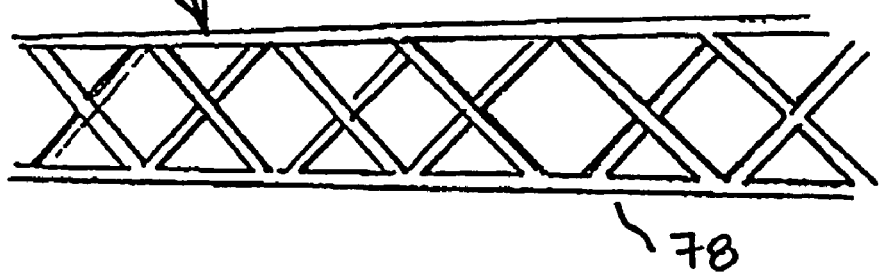
FIGS. 33A and 33B illustrate road barriers including at least one wire-like electroluminescent lamp according to the present invention.
Figure 33B:
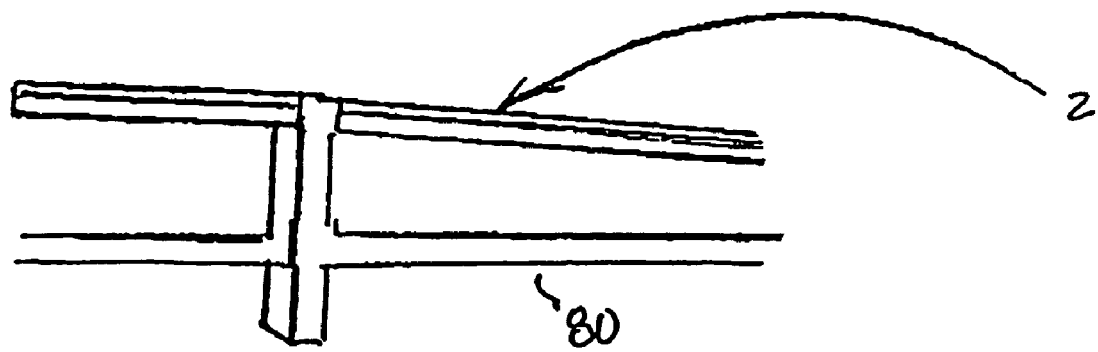
Figure 34:
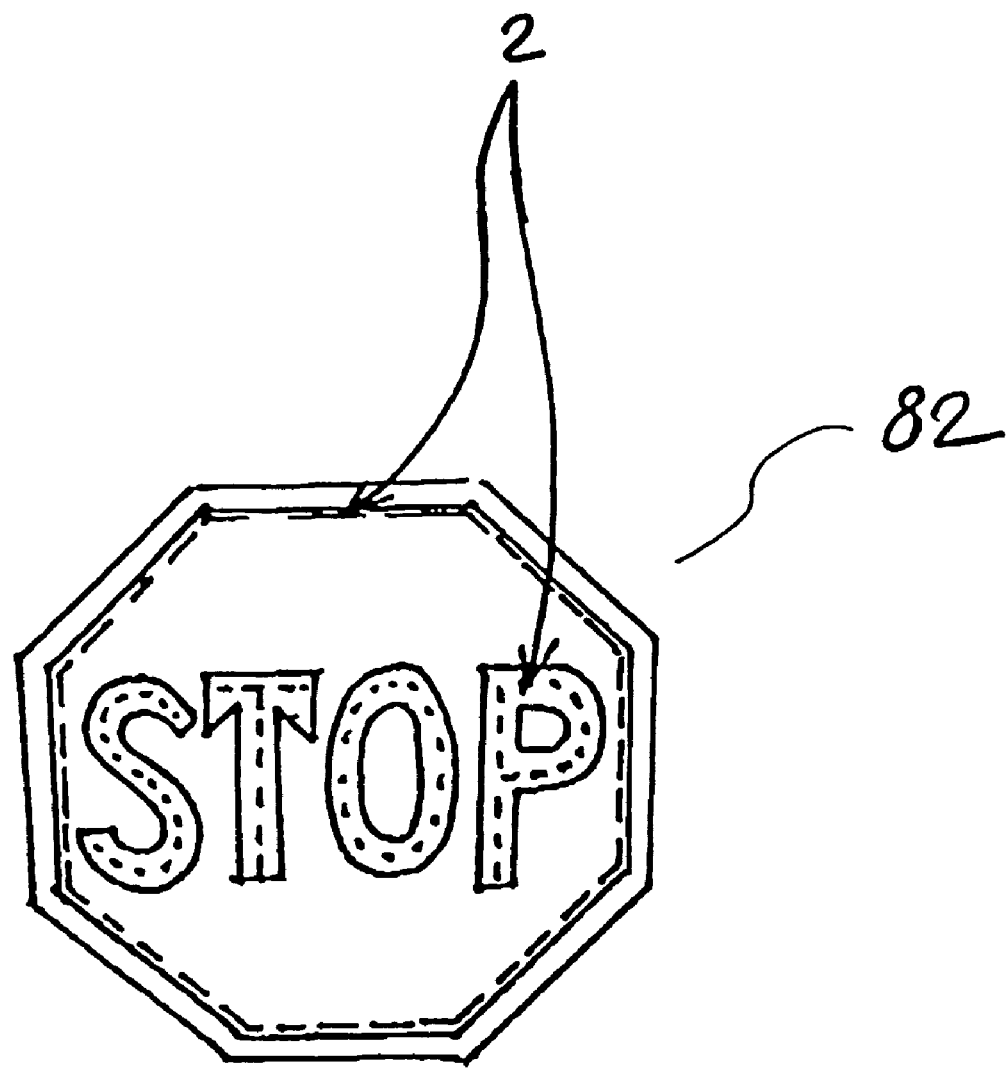
FIG. 34 illustrates a sign including at least one wire-like electroluminescent lamp according to the present invention.

Other examples where the wire-like electroluminescent lamps may be arranged under a transparent or semi-transparent layer of a rigid surface include diving fins 34 (as illustrated in FIG. 6), goggles 36 (as illustrated in FIG. 7), life rafts 72 (as illustrated in FIG. 30), barriers such as traffic cones 74 (as illustrated in FIGS. 31A–B), vehicles 76 (as illustrated in FIGS. 32A–B), road barriers 78 and 80 including fencing (as illustrated in FIGS. 33A–B), and signs 82 (as illustrated in FIG. 34). This arrangement provides additional protection for the wire-like electroluminescent lamp 2. The lamp and power unit may also be secured to the foregoing products according to the first embodiment of the present invention.

Figure 35:
FIG. 35 illustrates a helmet including at least one wire-like electroluminescent lamp according to the present invention.

A wire-like electroluminescent lamp 2 may also be placed in a channel formed in the foam of a safety helmet such that a transparent or semi-transparent shell of the safety helmet is formed over the foam including the wire-like lamp, as shown in FIG. 35. This will not only enhance the appearance of the helmet, but also help preserve and shelter the wire-like electroluminescent fibers from damage without compromising the integrity of the helmet. By placing the wire-like electroluminescent lamp under the shell, the aerodynamic design of the helmet is maintained, without reducing the safety of the helmet.

Figure 36B:
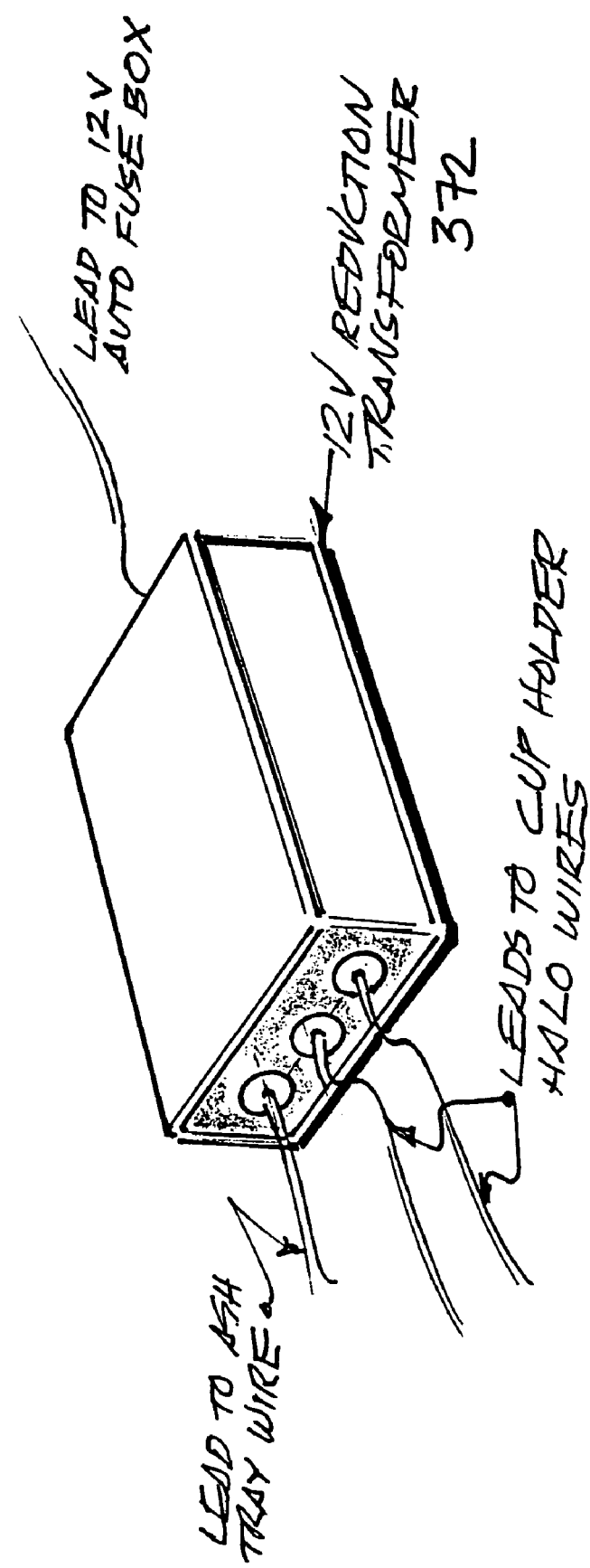
FIG. 36B illustrates the connection of the wire-like electroluminescent lamp of FIG. 36A to a vehicle battery supply according to the present invention.

Another benefit can be achieved by securing an electroluminescent lamp 2 into a recess of a rigid surface to provide visibility to products that are frequently used in hard to see places. An example is illustrated in FIG. 36A wherein an electroluminescent lamp 2 is secured to a recess formed on the perimeter of a cup holder 90 used in any type of vehicle. The benefit gained here is allowing a user to place a drink into the holder 90 with little effort during the night, or while driving through tunnels, etc., when the cup holder would otherwise be difficult to find without a considerable amount of effort. FIG. 36B illustrates the hook up of the illuminated cup cylinder 90 to a 12 volt battery system of a vehicle. Leads from an ash tray and the cup holder 90 are connected to a 12 volt reduction transformer 372. The cup holder 90 may also operate with an independent power unit. In FIG. 36C, a portable cup holder is illustrated that operates independently of the vehicle battery supply.

The electroluminescent lamps 2 may be temporarily or permanently secured to all of the products stated above by adhesive, Velcro, snaps, or other suitable means, and therefore is not limited to securing the electroluminescent lamps 2 to the surfaces by using a recess or channel formed therein. Further, a thin transparent film may be placed over an electroluminescent lamp, which may or may not be encapsulated in an extrusion, that is secured on top of a rigid surface to provide protection and increase durability. Moreover, a reflective film may be provided over the lamp to enhance visibility. As noted above, the power unit 6 may also be either temporarily or permanently secured to the surface.

The wire-like electroluminescent lamp 2 of the present invention is independently powered by its own energy source which may be battery, solar, photovoltaic, or AC format energy. Use of the electroluminescent lamp 2 adds benefit in both the sport and industrial markets, in any situation where added visibility promotes safety or adds another dimension to product design.

The present invention incorporates a wire-like electroluminescent lamp 2 into all apparel, including sports and safety apparel, adding another dimension to clothing. The wire-like electroluminescent lamp 2 adds a visible difference to clothing by illuminating garments in a subtle fashion.

The wire-like electroluminescent light 2 may also be incorporated into bags, shoes, sneakers, belts, etc., that work as accessories to apparel and into almost all sport and safety equipment. The specific uses mentioned herein are only a few of those that would benefit from adding electroluminescent fibers. One skilled in the art could secure the electroluminescent wire light to almost any safety device or sport accessory.

Moreover, in addition to providing safety, the wire-like electroluminescent light can be used to create exciting and innovative designs to give the product a hi-tech appearance, thereby providing ornamentation to the product. The wire-like electroluminescent lamp 2 can even be used to personalize items by arranging the wire-like electroluminescent light to spell a name or a logo.

The wire-like electroluminescent lamps may be made in a variety of colors such as yellow, green, and orange, and may be monochrome or polychrome, as described in U.S. Pat. No. 5,485,355, noted above. The colors are vibrant, and may be made to change in sequence and blink in series by use of a programmable controller and inverter discussed above. The color may result from the type of phosphors used as described in the above-referenced patent. In addition, the color may result from mixing the phosphors with dyes or from placing a wire-like electroluminescent lamp in a colored sleeve 4A or extrusion 4B. Further, in each of the above-noted embodiments, the wire-like electroluminescent lamps may be arranged such that the transparent or semi-transparent material over the lamp, which may be clear or colored, is reflective to add additional safety.

In addition, the wire-like electroluminescent lamp 2 in all of the embodiments herein may be housed in a sleeve. The temporarily housed wire-like electroluminescent lamps 2 may be easily interchanged with replacement wires that are available in an assortment of colors, as discussed above. In addition, the sleeve may be provided in a variety of colors. In addition, in all of the embodiments described herein, the power unit may be waterproof.

While specific examples have been described herein, it is to be understood that the invention is not limited to these examples. One skilled in the art may recognize that modifications can be made without departing from the scope and spirit of the invention.

What is claimed is:

1. Apparatus for marine use, comprising:
    an immersible structure having at least one transparent or semi-transparent surface layer;
    an electroluminescent lamp recessed in an outer surface of said immersible structure beneath said transparent or semi-transparent layer;
    wherein said immersible structure comprises a diving fin.

* * * * *